United States Patent
Kitazawa et al.

(10) Patent No.: US 9,840,594 B2
(45) Date of Patent: Dec. 12, 2017

(54) ORGANOPOLYSILOXANE COMPOUND AND METHOD FOR PRODUCING THE SAME, AND ADDITION-CURABLE SILICONE COMPOSITION

(71) Applicant: SHIN-ETSU CHEMICAL CO., LTD., Tokyo (JP)

(72) Inventors: Keita Kitazawa, Annaka (JP); Takahiro Yamaguchi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/115,588

(22) PCT Filed: Dec. 2, 2014

(86) PCT No.: PCT/JP2014/081820
§ 371 (c)(1),
(2) Date: Jul. 29, 2016

(87) PCT Pub. No.: WO2015/114939
PCT Pub. Date: Aug. 6, 2015

(65) Prior Publication Data
US 2017/0066886 A1    Mar. 9, 2017

(30) Foreign Application Priority Data

Jan. 31, 2014  (JP) .................................. 2014-016703
Apr. 10, 2014  (JP) .................................. 2014-080654

(51) Int. Cl.
*C08G 77/50*  (2006.01)
*C08L 83/14*  (2006.01)
(Continued)

(52) U.S. Cl.
CPC .............. *C08G 77/50* (2013.01); *C08L 83/04* (2013.01); *C08L 83/14* (2013.01); *C08G 77/12* (2013.01);
(Continued)

(58) Field of Classification Search
None
See application file for complete search history.

(56) References Cited

U.S. PATENT DOCUMENTS 4,481,341 A   11/1984  Schlak et al.
5,009,957 A    4/1991  Lee et al.
(Continued)

FOREIGN PATENT DOCUMENTS

EP   0 543 410 A1    5/1993
EP   2 937 352 A1   10/2015
(Continued)

OTHER PUBLICATIONS

Machine translation of JP 06-248084, translation generated Mar. 2017, 7 pages.*

(Continued)

*Primary Examiner* — Robert S Loewe
(74) *Attorney, Agent, or Firm* — Birch, Stewart, Kolasch & Birch, LLP

(57) ABSTRACT

Provided are: a novel organopolysiloxane compound containing a vinylene group, which can be used as a base polymer for an addition-curable silicone composition, particularly an organopolysiloxane compound containing a terminal vinylene group; and a method for producing the organopolysiloxane compound. An organopolysiloxane compound characterized by having at least one unit represented by formula (1) as a partial structure, and also characterized by being linear or branched.

(Continued)

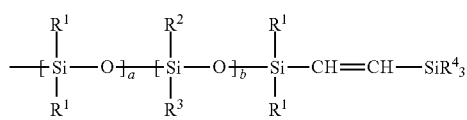

(1)

[$R^1$'s independently represent a hydrogen atom or a monovalent hydrocarbon group having 1 to 20 carbon atoms; $R^2$'s independently represent a hydrogen atom, a monovalent hydrocarbon group having 1 to 20 carbon atoms, or a group represented by formula (a); x represents an integer of 0 to 1,998; $R^3$'s independently represent a group represented by formula (a);

$$\mathrm{O}{-}{\left[\mathrm{Si}(R^1)(R^1){-}\mathrm{O}\right]}_x{-}\mathrm{Si}(R^1)(R^1){-}\mathrm{CH}{=}\mathrm{CH}{-}\mathrm{SiR}^4{}_3 \quad (a)$$

$R^4$'s independently represent a monovalent hydrocarbon group having 1 to 20 carbon atoms; a represents an integer of 1 to 2,000; and b represents an integer of 0 to 1,999.]

11 Claims, 2 Drawing Sheets

(51) Int. Cl.
  *C08L 83/04* (2006.01)
  *C08G 77/12* (2006.01)
  *C08G 77/20* (2006.01)
(52) U.S. Cl.
  CPC ........ *C08G 77/20* (2013.01); *C08L 2205/025* (2013.01)

(56) References Cited

U.S. PATENT DOCUMENTS

| | | |
|---|---|---|
| 5,015,716 A | 5/1991 | Togashi et al. |
| 5,017,654 A | 5/1991 | Togashi et al. |
| 5,877,237 A | 3/1999 | Nakanishi et al. |
| 7,476,446 B2 | 1/2009 | Aoki |
| 2002/0156186 A1 | 10/2002 | Bublewitz et al. |
| 2006/0122351 A1 | 6/2006 | Laine et al. |

FOREIGN PATENT DOCUMENTS

| | | |
|---|---|---|
| EP | 2 937 375 A1 | 10/2015 |
| JP | 58-37053 A | 3/1983 |
| JP | 64-51140 A | 2/1989 |
| JP | 2-9448 A | 1/1990 |
| JP | 2-14244 A | 1/1990 |
| JP | 4-46962 A | 2/1992 |
| JP | 5-202193 A | 8/1993 |
| JP | 6-248084 A | 9/1994 |
| JP | 7-196921 A | 8/1995 |
| JP | 2004-190013 A | 7/2004 |
| JP | 2006-225420 A | 8/2006 |
| JP | 2008-523165 A | 7/2008 |
| JP | 2011-45798 A | 3/2011 |
| PL | 188754 B1 | 4/2005 |
| PL | 188755 B1 | 4/2005 |
| WO | WO 2013/081794 A1 | 6/2013 |
| WO | WO 2014/097573 A1 | 6/2014 |
| WO | WO 2014/097574 A1 | 6/2014 |

OTHER PUBLICATIONS

International Search Report for PCT/JP2014/081820 dated Mar. 17, 2015.
Sore et al., "Organic & Biomolecular Chemistry", Org. Biomol. Chem., 2011, 9, pp. 504-515.
Written Opinion of the International Searching Authority for PCT/JP2014/081820 dated Mar. 17, 2015.

\* cited by examiner

<Ch1: MOLECULAR WEIGHT CALCULATION RESULTS>
PEAK 1 BASE PEAK

| | [MINUTES] | [mV] | [MOL] |
|---|---|---|---|
| START OF PEAK : | 11.94 | 0.150 | 259,418 |
| TOP OF PEAK : | 14.00 | 94.992 | 31,108 |
| END OF PEAK : | 19.93 | 0.086 | 62 |
| SURFACE AREA [mV·sec] | | 10,638.764 | |
| SURFACE AREA RATIO [%] | | 98.406 | |
| HEIGHT [mV] | | 94.963 | |
| [η] | | 30,961.83511 | |

| | | |
|---|---|---|
| Mn | : | 10,338 |
| Mw | : | 30,962 |
| Mz | : | 47,868 |
| Mz+1 | : | 64,958 |
| Mv | : | 30,962 |
| Mp | : | 30,498 |
| Mz/Mw | : | 1.546 |
| Mw/Mn | : | 2.995 |
| Mz+1/Mw | : | 2.098 |

ORGANOPOLYSILOXANE COMPOUND AND METHOD FOR PRODUCING THE SAME, AND ADDITION-CURABLE SILICONE COMPOSITION

TECHNICAL FIELD

This invention relates to novel organopolysiloxane compounds, especially terminal vinylene group-containing organopolysiloxane compounds, and to a method for preparing the same.

The invention also relates to addition-curable silicone compositions which, by making use of such organopolysiloxane compounds, exhibit excellent shelf stability and heat resistance.

BACKGROUND ART

Organopolysiloxane compounds having aliphatic unsaturated monovalent hydrocarbon groups on silicon atoms are useful as the base polymer in addition-curable silicone compositions. Because addition-curable silicone compositions cure to form silicone gels and silicone rubbers having excellent electrical properties, cold resistance and the like, they are widely used as, for example, encapsulants, fillers and coatings for electrical and electronic components and for semiconductor devices, and as photosemiconductor insulating/covering/protecting agents.

Addition-curable silicone compositions use, for the most part, an organopolysiloxane compound having vinyl groups on silicon atoms as the base polymer, which compound undergoes a hydrosilylation reaction with organohydrogen (poly)siloxane to give a silicone cured product.

However, aliphatic unsaturated hydrocarbon groups capable of being used in hydrosilylation reactions are not inherently limited to vinyl groups; so long as an organopolysiloxane compound has, as a partial structure, aliphatic carbon-carbon multiple bonds, use of the compound as the base resin of an addition-curable silicone composition is theoretically possible.

In particular, when a base polymer having, as a partial structure, at least one unit of general formula (b) below

[Chemical Formula 1]

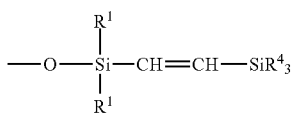

(b)

(wherein $R^1$ is a hydrogen atom or a monovalent hydrogen group of 1 to 20 carbon atoms which may have a substituent, each $R^1$ being the same or different; and $R^4$ is a monovalent hydrocarbon group of 1 to 20 carbon atoms which may have a substituent, each $R^4$ being the same or different) is used, improved control of the curing reaction rate and improved composition properties due to the substituent effects by the triorganosilyl groups substituted onto vinyl groups are expected.

The simplest compounds having, as partial structures, two units of general formula (b) are represented by general formula (c) below

[Chemical Formula 2]

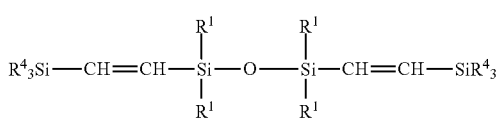

(c)

(wherein $R^1$ is a hydrogen atom or a monovalent hydrogen group of 1 to 20 carbon atoms which may have a substituent, each $R^1$ being the same or different; and $R^4$ is a monovalent hydrocarbon group of 1 to 20 carbon atoms which may have a substituent, each $R^4$ being the same or different).

A compound that corresponds to general formula (c) appears in a synthesis example for 1,1,3,3-tetramethyl-1,3-bis[2-(trimethylsilyl)ethenyl]-(E,E)-disiloxane of formula (6) below that has been reported in the literature (*Org. Biomol. Chem.* 9, 504 (2011); Non-Patent Document 1).

[Chemical Formula 3]

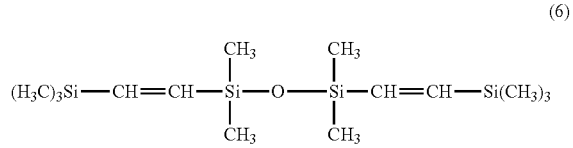

(6)

However, this compound has a small molecular weight and has been difficult to use as the base polymer of addition-curable silicone compositions.

Here, because addition-curable silicone compositions cure to form silicone gels, silicone rubbers and hardcoats having excellent electrical properties, cold resistance, heat resistance and chemical stability, they are widely used as, for example, encapsulants, fillers and coatings for electrical and electronic components and for semiconductor devices, and as photosemiconductor insulating/covering/protecting agents. Moreover, by including various types of inorganic fillers, it is possible to increase the strength of the composition and to impart heat resistance. In addition, such compositions are also used as heat-dissipating materials and electrically conductive materials for electronic components such as semiconductor devices and LED substrates.

Although the properties desired of these addition-curable silicone compositions appear to differ somewhat depending on the technical field and application, a good shelf stability and a good heat resistance are among the most important properties in any technical field and application.

Among the methods that have been disclosed for increasing the shelf stability of compositions are methods wherein a hydrosilylation catalyst that promotes an addition reaction is included within the composition by being embedded and encapsulated in a thermoplastic resin or silicone resin having a specific melting point, and is subsequently released into the silicone composition by melting the resin under applied heat or by dissolving the resin with a solvent (Patent Documents 1 to 6: JP-A S58-37053, JP-A S64-51140, JP-A H02-9448, JP-A H02-14244, JP-A H05-202193 and JP-A H07-196921). However, a drawback of such methods involving microcapsulation is that a high-concentration platinum family metal catalyst is unevenly distributed within the composition, which tends to give rise to localized curing.

A method that uses an acetylene alcohol or the like as a reaction inhibitor has also been proposed, and is described as preventing partial curing reactions (Patent Document 7: JP-A H04-46962). Yet, this composition too, when used more broadly in various applications, sometimes gives rise to a number of drawbacks. For example, in cases where a foam is to be obtained on a heating line by including a hydroxyl group source such as an alcohol or water in the composition, it is known that foaming due to a small amount of dehydrogenation at the start of the reaction serves as the nucleus, enabling a good foam to be obtained. However, the above reaction inhibitor also acts to inhibit such initial foaming, preventing a good foam from being obtained. In addition, in cases where such compositions are used as millable addition-curable materials, when curing is carried out at a high speed so as to mold electrical wire, tubing or the like, a number of problems arise; for example, the surface remains tacky and a molded product having a smooth surface cannot be obtained.

Methods that have been proposed for increasing the heat resistance of silicone compositions include the approach of adding a heat resistance-imparting agent. Heat resistance-imparting agents that have been mentioned include amine compounds such as hindered amines (Patent Document 8:

[Chemical Formula 4]

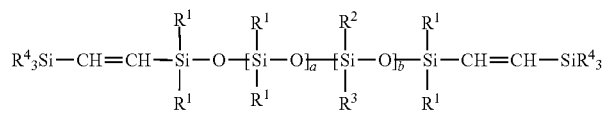

(2)

JP-A 2004-190013). However, amine compounds act as catalyst poisons in hydrosilylation reactions, and thus are undesirable. In particular, they cannot be used for molding in a short period of time.

A method for increasing the heat resistance of silicone compositions by adding a metal oxide such as iron oxide, titanium oxide, cerium oxide, magnesium oxide, aluminum oxide or zinc oxide has also been disclosed (Patent Document 9: JP-A 2006-225420). However, the addition of these metal oxides greatly lowers the transparency of the composition, and so this approach cannot be applied to materials required to have transparency.

PRIOR ART DOCUMENTS

Patent Documents

Patent Document 1: JP-A S58-37053
Patent Document 2: JP-A S64-51140
Patent Document 3: JP-A H02-9448
Patent Document 4: JP-A H02-14244
Patent Document 5: JP-A H05-202193
Patent Document 6: JP-A H07-196921
Patent Document 7: JP-A H04-46962
Patent Document 8: JP-A 2004-190013
Patent Document 9: JP-A 2006-225420

Non-Patent Document

Non-Patent Document 1: *Org. Biomol. Chem.* 9, 504 (2011)

SUMMARY OF THE INVENTION

Problems to be Solved by the Invention

This invention was arrived at in light of the above circumstances. One object of the invention is to provide novel vinylene group-containing organopolysiloxane compounds, particularly vinylene group-containing organopolysiloxane compounds, which can be used as the base polymer in addition-curable silicone compositions. Another object is to provide a method for preparing such compounds.

A further object of the invention is to provide addition-curable silicone compositions which make use of such organopolysiloxane compounds and exhibit excellent storage stability and heat resistance.

Means for Solving the Problems

In cases where a compound having units of above formula (b) is used as the base polymer in an addition-curable silicone composition, it is effective to use an organopolysiloxane compound of general formula (2) below in which the siloxane unit in the structure of above formula (c) has been elongated. However, synthesis examples of such organopolysiloxane compounds have not yet been reported.

In formula (2), $R^1$ is a hydrogen atom or a monovalent hydrocarbon group of 1 to 20 carbon atoms which may have a substituent, each $R^1$ being the same or different. $R^2$ is a hydrogen atom, a monovalent hydrocarbon group of 1 to 20 carbon atoms which may have a substituent, or a group of general formula (a) below

[Chemical Formula 5]

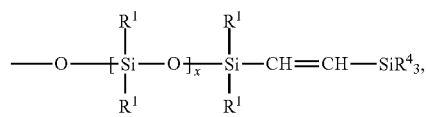

(a)

each $R^2$ being the same or different. The letter x is an integer from 0 to 1,998. $R^3$ is a group of formula (a) above, each $R^3$ being the same or different. $R^4$ is a monovalent hydrocarbon group of 1 to 20 carbon atoms which may have a substituent, each $R^4$ being the same or different. The letter a is an integer from 1 to 2,000, the letter b is an integer from 0 to 1,999, and the sum of a, b and x is an integer from 1 to 2,000.

The inventors have conducted extensive investigations in order to achieve the above objects, as a result of which they have discovered that novel linear or branched organopolysiloxane compounds having at least one unit of general formula (1) below, and particularly, as compounds having such units, terminal vinylene group-containing organopolysiloxane compounds of general formula (2) below that can be prepared by an equilibration reaction between a compound of general formula (3) below and a compound of general formula (4) below or a compound of general formula (5) below in the presence of an acidic or basic catalyst, can be suitably used as the base polymer in addition-curable silicone compositions.

The inventors have also discovered that addition-curable silicone compositions containing as the essential ingredients such a terminal vinylene group-containing organopolysiloxane compound, an organohydrogenpolysiloxane compound having two or more silicon atom-bonded hydrogen atoms (SiH groups) per molecule and a hydrosilylation catalyst, and preferably containing also one or more regulator selected from the group consisting of acetylene compounds, nitrogen compounds, organophosphorus compounds, oxime compounds and organochlorine compounds, exhibit excellent shelf stability and heat resistance.

Accordingly, the invention provides an organopolysiloxane compound which is characterized by being linear or branched and having, as a partial structure, at least one unit of general formula (1) below

[Chemical Formula 6]

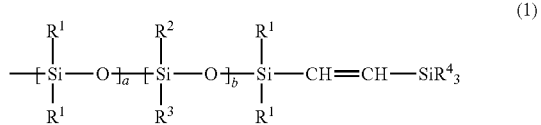
(1)

(wherein $R^1$ is a hydrogen atom or a monovalent hydrocarbon group of 1 to 20 carbon atoms which may have a substituent, each $R^1$ being the same or different; $R^2$ is a hydrogen atom, a monovalent hydrocarbon group of 1 to 20 carbon atoms which may have a substituent, or a group of general formula (a) below

[Chemical Formula 7]

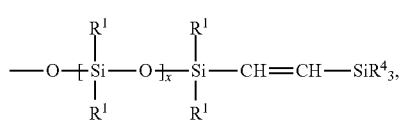
(a)

each $R^2$ being the same or different; the letter x is an integer from 0 to 1,998; $R^3$ is a group of above formula (a), each $R^3$ being the same or different; $R^4$ is a monovalent hydrocarbon group of 1 to 20 carbon atoms which may have a substituent, each $R^4$ being the same or different; the letter a is an integer from 1 to 2,000; and the letter b is an integer from 0 to 1,999).

In another aspect, the invention provides a terminal vinylene group-containing organopolysiloxane compound of general formula (2) below

[Chemical Formula 8]

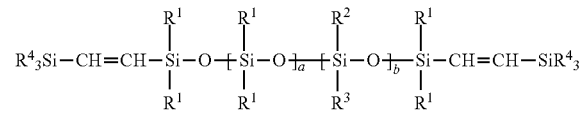
(2)

(wherein $R^1$ is a hydrogen atom or a monovalent hydrocarbon group of 1 to 20 carbon atoms which may have a substituent, each $R^1$ being the same or different; $R^2$ is a hydrogen atom, a monovalent hydrocarbon group of 1 to 20 carbon atoms which may have a substituent, or a group of general formula (a) below

[Chemical Formula 9]

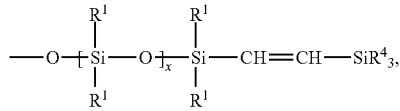
(a)

each $R^2$ being the same or different; the letter x is an integer from 0 to 1,998; $R^3$ is a group of above formula (a), each $R^3$ being the same or different; $R^4$ is a monovalent hydrocarbon group of 1 to 20 carbon atoms which may have a substituent, each $R^4$ being the same or different; the letter a is an integer from 1 to 2,000; the letter b is an integer from 0 to 1,999; and the sum of a, b and x is an integer from 1 to 2,000).

The invention also provides a method for preparing a terminal vinylene group-containing organopolysiloxane compound of general formula (2) below

[Chemical Formula 10]

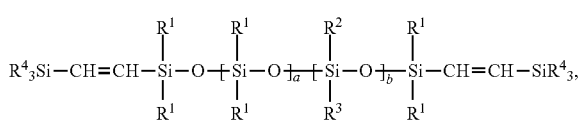
(2)

the method being characterized by carrying out an equilibration reaction between a compound of general formula (3) below

(3)

and a compound of general formula (4) below

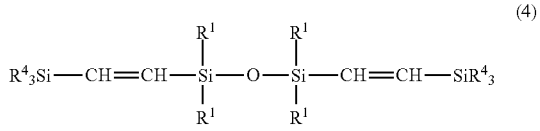
(4)

or a compound of general formula (5) below

$$R^{20}{}_{4-y}-Si-R^{30}{}_y \tag{5}$$

(where, in the above formulas, $R^1$ is a hydrogen atom or a monovalent hydrocarbon group of 1 to 20 carbon atoms which may have a substituent, each $R^1$ being the same or different; $R^2$ is a hydrogen atom, a monovalent hydrocarbon group of 1 to 20 carbon atoms which may have a substituent, or a group of general formula (a) below

[Chemical Formula 11]

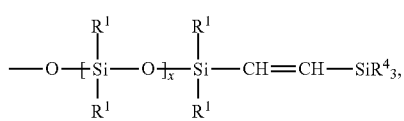
(a)

each $R^2$ being the same or different; the letter x is an integer from 0 to 1,998; $R^3$ is a group of formula (a), each $R^3$ being the same or different; $R^4$ is a monovalent hydrocarbon group of 1 to 20 carbon atoms which may have a substituent, each $R^4$ being the same or different; the letter a is an integer from 1 to 2,000, the letter b is an integer from 0 to 1,999, and the sum of a, b and x is an integer from 1 to 2,000; $R^{20}$ is a hydrogen atom, a monovalent hydrocarbon group of 1 to 20 carbon atoms which may have a substituent, or a group of general formula (a0) below

[Chemical Formula 12]

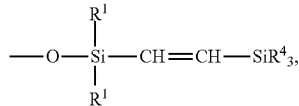

(a0)

each $R^{20}$ being the same or different; $R^{30}$ is a group of formula (a0) above, each $R^{30}$ being the same or different; the letter m is an integer from 3 to 20; and the letter y is 3 or 4) in the presence of an acidic or basic catalyst.

The invention additionally provides an addition-curable silicone composition characterized by comprising, as essential ingredients:

(A) 100 parts by weight of a terminal vinylene group-containing organopolysiloxane compound of general formula (2A) below

[Chemical Formula 13]

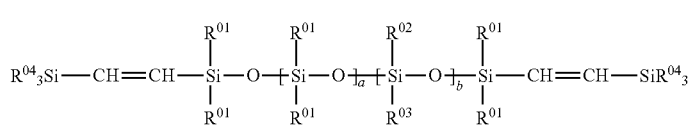

(2A)

(wherein $R^{01}$ is a monovalent hydrocarbon group of 1 to 20 carbon atoms which may have a substituent, each $R^{01}$ being the same or different; $R^{02}$ is a monovalent hydrocarbon group of 1 to 20 carbon atoms which may have a substituent, or a group of general formula (a') below

[Chemical Formula 14]

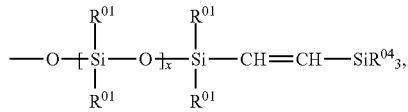

(a')

each $R^{02}$ being the same or different; the letter x is an integer from 0 to 1,998; $R^{03}$ is a group of above formula (a'), each $R^{03}$ being the same or different; $R^{04}$ is a monovalent hydrocarbon group of 1 to 20 carbon atoms which may have a substituent, each $R^{04}$ being the same or different; the letter a is an integer from 1 to 2,000; the letter b is an integer from 0 to 1,999; and the sum of a, b and x is an integer from 1 to 2,000);

(B) an organohydrogenpolysiloxane compound having two or more silicon atom-bonded hydrogen atoms (SiH groups) per molecule, in an amount such that the number of SiH groups in component (B) relative to the sum of the number of aliphatic unsaturated hydrocarbon groups in component (A) is from 0.5 to 5; and (C) an effective amount of a hydrosilylation catalyst.

In this case, the addition-curable silicone composition may include (D) an effective amount of one or more regulator selected from the group consisting of acetylene compounds, nitrogen compounds, organophosphorus compounds, oxime compounds and organochlorine compounds; may include (E) from 1 to 2,000 parts by weight of at least one inorganic filler selected from the group consisting of metals, metal oxides, metal hydroxides, metal nitrides, metal carbonates and carbon allotropes per 100 parts by weight of component (A); and may include either or both of:

(F) from 1 to 200 parts by weight of a hydrolyzable organopolysiloxane compound of general formula (i) below

[Chemical Formula 15]

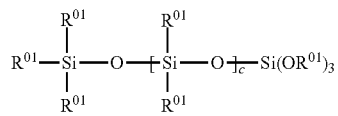

(i)

(wherein $R^{01}$ is a monovalent hydrocarbon group of 1 to 20 carbon atoms which may have a substituent, each $R^{01}$ being the same or different; and the letter c is an integer from 5 to 100) per 100 parts by weight of component (A), and (G) from 0.01 to 10 parts by weight of a hydrolyzable organosilane compound of general formula (ii) below

[Chemical Formula 16]

$R^{05}$—$Si(OR^{01})_3$  (ii)

(wherein $R^{01}$ is a monovalent hydrocarbon group of 1 to 20 carbon atoms which may have a substituent, each $R^{01}$ being the same or different; and $R^{05}$ is a monovalent hydrocarbon group of 1 to 20 carbons which may have a substituent) per 100 parts by weight of component (A).

Advantageous Effects of the Invention

When the novel terminal vinylene group-containing organopolysiloxane compound of the invention is used as the base polymer of an addition-curable silicone composition, it is expected to provide, for example, improved control of the curing reaction rate and improved composition properties due to the substituent effects of the triorganosilyl group that has been substituted onto the vinyl group.

The method of the invention enables the stable preparation of a terminal vinylene group-containing organopolysiloxane compound which, when used as the base polymer of an addition-curable silicone composition, is expected to provide, for example, improved control of the curing reaction rate and improved composition properties due to the substituent effects of the triorganosilyl group that has been substituted onto the vinyl group.

Moreover, the addition-curable silicone composition of the invention exhibits excellent shelf stability and heat resistance.

BRIEF DESCRIPTION OF THE DIAGRAMS

EMBODIMENT FOR CARRYING OUT THE INVENTION

Figure 1:
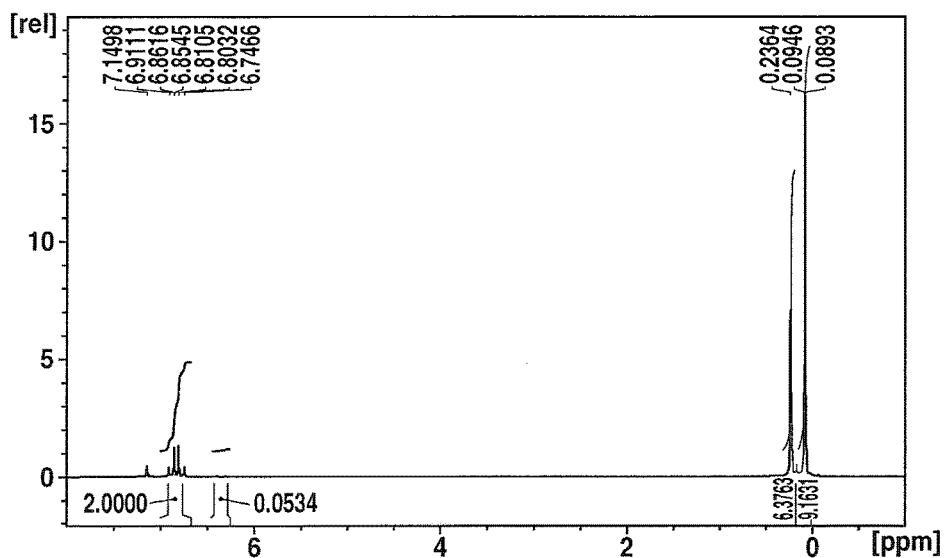
FIG. 1 is an $^1$H-NMR spectrum of the 1,1,3,3-tetramethyl-1,3-bis[2-(trimethylsilyl)ethenyl]-(E,E)-disiloxane obtained in Synthesis Example 1 of the invention.

The organopolysiloxane compounds of the invention, particularly terminal vinylene group-containing organopolysiloxane compounds, and the inventive method for preparing terminal vinylene group-containing organopolysiloxane compounds are described below in detail, although the invention is not limited thereby.

Organopolysiloxane Compound

The novel organopolysiloxane compound of the invention is characterized by being linear or branched and by having, as a partial structure, at least one unit of general formula (1) below

[Chemical Formula 17]

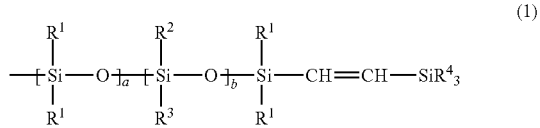

(1)

(wherein $R^1$ is a hydrogen atom or a monovalent hydrocarbon group of 1 to 20 carbon atoms which may have a substituent, each $R^1$ being the same or different; $R^2$ is a hydrogen atom, a monovalent hydrocarbon group of 1 to 20 carbon atoms which may have a substituent, or a group of general formula (a) below

[Chemical Formula 18]

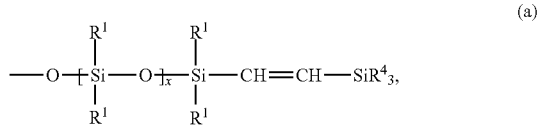

(a)

each $R^2$ being the same or different; the letter x is an integer from 0 to 1,998; $R^3$ is a group of above formula (a), each $R^3$ being the same or different; $R^4$ is a monovalent hydrocarbon group of 1 to 20 carbon atoms which may have a substituent, each $R^4$ being the same or different; the letter a is an integer from 1 to 2,000; and the letter b is an integer from 0 to 1,999).

This organopolysiloxane compound is characterized by having, on a terminal silicon atom, a vinyl group substituted with a triorganosilyl group.

When such an organopolysiloxane compound is used as the base polymer of an addition-curable silicone composition, it is expected to provide improved control of the curing reaction rate and improved composition properties due to the substituent effect by the triorganosilyl group substituted onto the vinyl group.

$R^1$ in above formula (1) is a hydrogen atom or a monovalent hydrocarbon group of 1 to 20 carbon atoms that may have a substituent. Preferred examples include a hydrogen atom, monovalent saturated aliphatic hydrocarbon groups which may have a substituent, monovalent unsaturated aliphatic hydrocarbon groups which may have a substituent and monovalent aromatic hydrocarbon groups (including aromatic heterocycles) which may have a substituent. A hydrogen atom, a monovalent saturated aliphatic hydrocarbon group which may have a substituent or a monovalent aromatic hydrocarbon group which may have a substituent is more preferred, and a monovalent saturated aliphatic hydrocarbon group which may have a substituent is especially preferred.

Illustrative examples of monovalent saturated aliphatic hydrocarbon groups which may have a substituent include the following groups of 1 to 20 carbon atoms, preferably 1 to 12 carbon atoms, and more preferably 1 to 6 carbon atoms: linear alkyl groups such as methyl, ethyl, propyl, butyl, pentyl, hexyl, heptyl and octyl; branched alkyl groups such as isopropyl, isobutyl, tert-butyl, isopentyl and neopentyl; cycloalkyl groups such as cyclopentyl, cyclohexyl and cycloheptyl; and halogen-substituted alkyl groups such as chloromethyl, 3-chloropropyl, 3,3,3-trifluoropropyl and bromopropyl.

Illustrative examples of monovalent unsaturated aliphatic hydrocarbon groups which may have a substituent include the following groups of 2 to 20 carbon atoms, preferably 2 to 12 carbon atoms, and more preferably 2 to 6 carbon atoms: alkenyl groups such as ethenyl, 1-methylethenyl and 2-propenyl; and alkynyl groups such as ethynyl and 2-propynyl.

Illustrative examples of monovalent aromatic hydrocarbon groups which may have a substituent include the following groups of 6 to 20 carbon atoms, preferably 6 to 12 carbon atoms, and more preferably 6 carbon atoms: aryl groups such as phenyl and tolyl; aralkyl groups such as benzyl and 2-phenylethyl; and halogen-substituted aryl groups such as α,α,α-trifluorotolyl and chlorobenzyl.

Of these, $R^1$ is preferably methyl, ethyl, 3,3,3-trifluoropropyl or phenyl; and more preferably methyl, ethyl or phenyl.

$R^2$ in above formula (1) is a hydrogen atom, a monovalent hydrocarbon group of 1 to 20 carbon atoms that may have a substituent, or a group of general formula (a) below

[Chemical Formula 19]

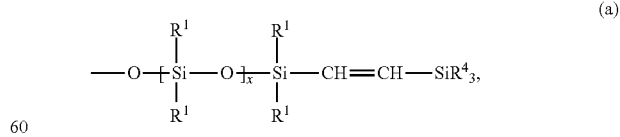

(a)

(wherein $R^1$ and $R^4$ are as defined above; and the letter x is an integer from 0 to 1,998, preferably from 0 to 1,800, and more preferably from 0 to 1,500). Preferred examples include a hydrogen atom, monovalent saturated aliphatic hydrocarbon groups which may have a substituent, monovalent unsaturated aliphatic hydrocarbon groups which may have a substituent, monovalent aromatic hydrocarbon groups (including aromatic heterocycles) which may have a substituent, and groups of formula (a). A hydrogen atom, monovalent saturated aliphatic hydrocarbon groups which may have a substituent, monovalent aromatic hydrocarbon groups which may have a substituent and groups of formula (a) are more preferred, with monovalent saturated aliphatic hydrocarbon groups which may have a substituent and groups of formula (a) being especially preferred.

Illustrative examples of monovalent saturated aliphatic hydrocarbon groups which may have a substituent include the following groups of 1 to 20 carbon atoms, preferably 1 to 12 carbon atoms, and more preferably 1 to 6 carbon atoms: linear alkyl groups such as methyl, ethyl, propyl, butyl, pentyl, hexyl, heptyl and octyl; branched alkyl groups such as isopropyl, isobutyl, tert-butyl, isopentyl and neopentyl; cycloalkyl groups such as cyclopentyl, cyclohexyl and cycloheptyl; and halogen-substituted alkyl groups such as chloromethyl, 3-chloropropyl, 3,3,3-trifluoropropyl and bromopropyl.

Illustrative examples of monovalent unsaturated aliphatic hydrocarbon groups which may have a substituent include the following groups of 2 to 20 carbon atoms, preferably 2 to 12 carbon atoms, and more preferably 2 to 6 carbon atoms: alkenyl groups such as ethenyl, 1-methylethenyl and 2-propenyl; and alkynyl groups such as ethynyl and 2-propynyl.

Illustrative examples of monovalent aromatic hydrocarbon groups which may have a substituent include the following groups of 6 to 20 carbon atoms, preferably 6 to 12 carbon atoms, and more preferably 6 carbon atoms: aryl groups such as phenyl and tolyl; aralkyl groups such as benzyl and 2-phenylethyl; and halogen-substituted aryl groups such as α,α,α-trifluorotolyl and chlorobenzyl.

Illustrative examples of groups of formula (a) include the following:

[Chemical Formula 20]

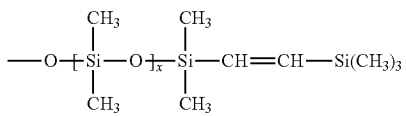
(a1)

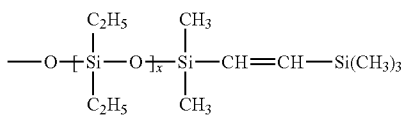
(a2)

[Chemical Formula 21]

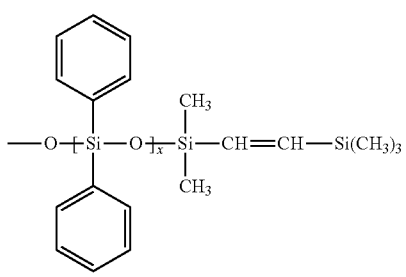
(a3)

(a4)
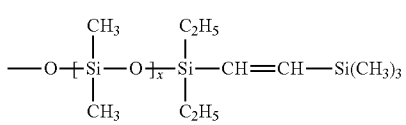

[Chemical Formula 22]

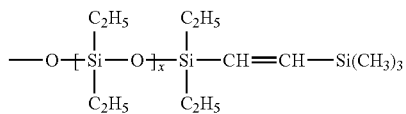
(a5)

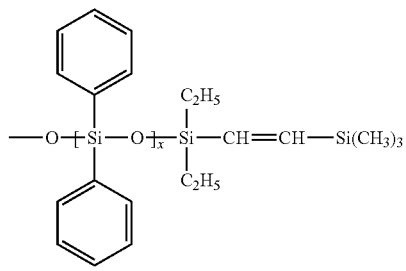
(a6)

[Chemical Formula 23]

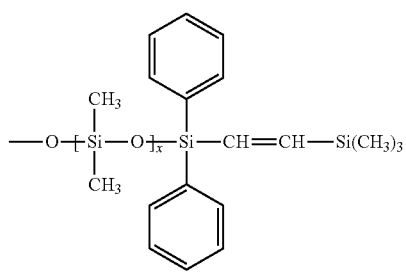
(a7)

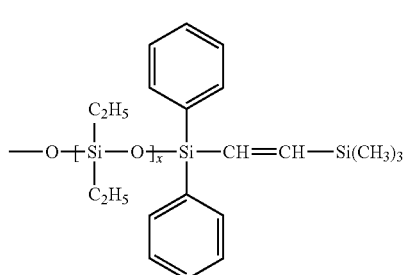
(a8)

[Chemical Formula 24]

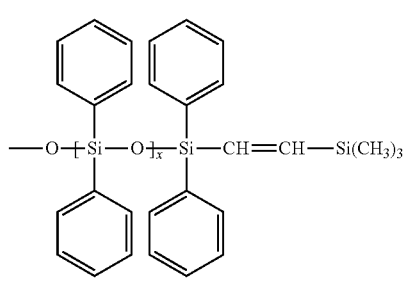
(a9)

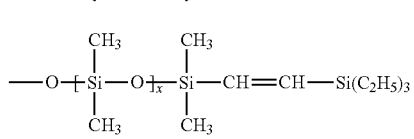
(a10)

[Chemical Formula 25]

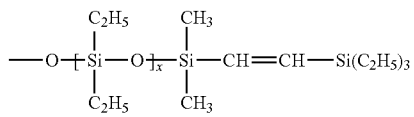
(a11)

(a12)
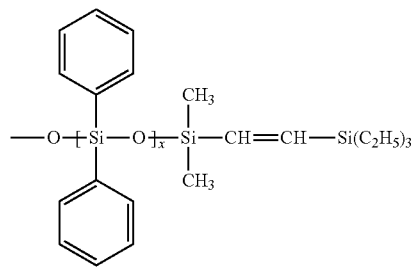
(a13)
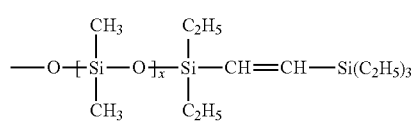
[Chemical Formula 26]
(a14)
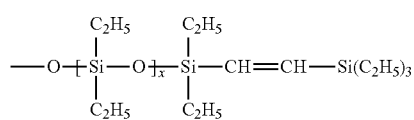
(a15)
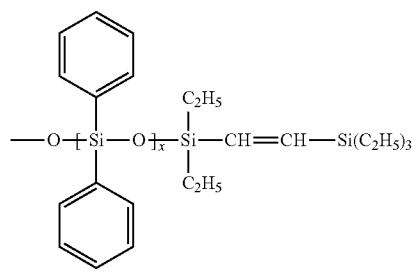
[Chemical Formula 27]
(a16)
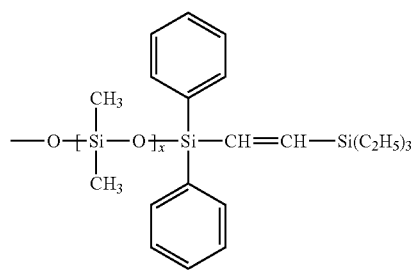
(a17)
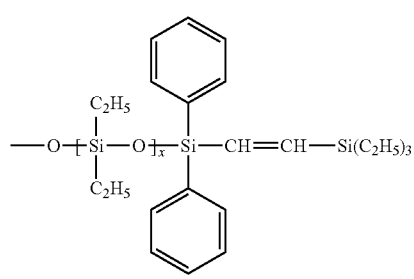
[Chemical Formula 28]
(a18)
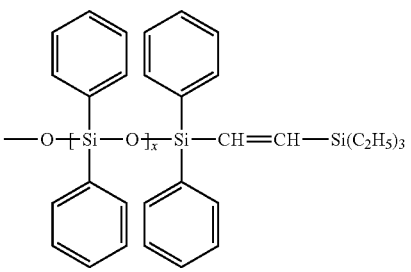
(a19)
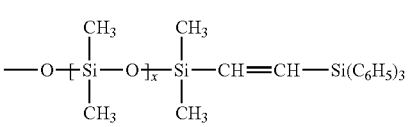
(a20)
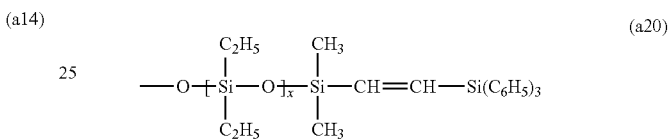
[Chemical Formula 29]
(a21)
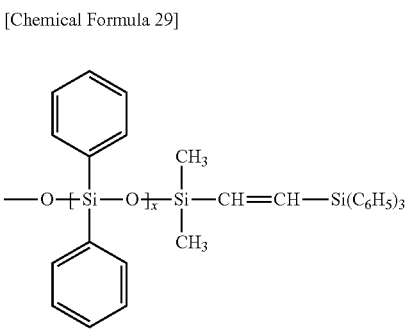
(a22)
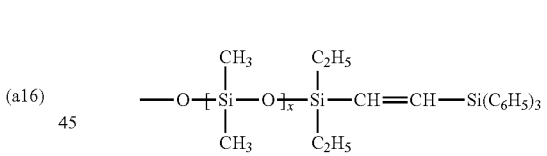
[Chemical Formula 30]
(a23)
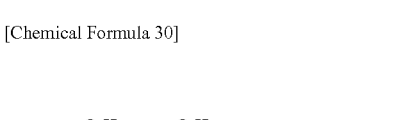
(a24)
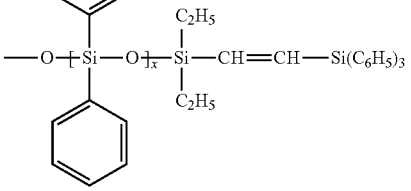

[Chemical Formula 31]

(a25)
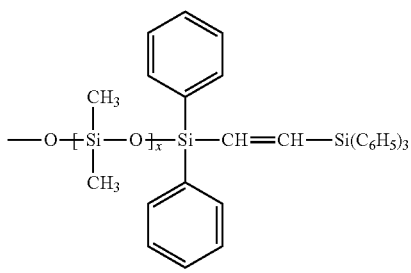

(a26)
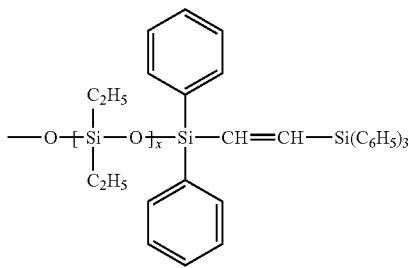

[Chemical Formula 32]

(a27)

—O—[Si—O]ₓ—Si—CH=CH—Si(C₆H₅)₃

(wherein x is as defined above).

Of these, $R^2$ is preferably methyl, ethyl, 3,3,3-trifluoropropyl, phenyl or, of groups of above formula (a), one in which $R^4$ is methyl; and is more preferably methyl, ethyl, phenyl or, of groups of above formula (a), one in which $R^4$ is methyl.

$R^3$ in formula (1) is a group of above formula (a). Illustrative examples of groups of formula (a) include the same groups of formula (a) as are exemplified for $R^2$ above. Of these, $R^3$ is preferably, of the groups of above formula (a), one in which $R^4$ is methyl.

$R^4$ in above formula (1) is a monovalent hydrocarbon group of 1 to 20 carbon atoms which may have a substituent. Preferred examples include monovalent saturated aliphatic hydrocarbon groups which may have a substituent, monovalent unsaturated aliphatic hydrocarbon groups which may have a substituent, and monovalent aromatic hydrocarbon groups (including aromatic heterocycles) which may have a substituent. A monovalent saturated aliphatic hydrocarbon group which may have a substituent or a monovalent aromatic hydrocarbon group which may have a substituent is more preferred, with a monovalent saturated aliphatic hydrocarbon group which may have a substituent being especially preferred.

Illustrative examples of monovalent saturated aliphatic hydrocarbon groups which may have a substituent include the following groups of 1 to 20 carbon atoms, preferably 1 to 12 carbon atoms, and more preferably 1 to 6 carbon atoms: linear alkyl groups such as methyl, ethyl, propyl, butyl, pentyl, hexyl, heptyl and octyl; branched alkyl groups such as isopropyl, isobutyl, tert-butyl, isopentyl and neopentyl; cycloalkyl groups such as cyclopentyl, cyclohexyl and cycloheptyl; and halogen-substituted alkyl groups such as chloromethyl, 3-chloropropyl, 3,3,3-trifluoropropyl and bromopropyl.

Illustrative examples of monovalent unsaturated aliphatic hydrocarbon groups which may have a substituent include the following groups of 2 to 20 carbon atoms, preferably 2 to 12 carbon atoms, and more preferably 2 to 6 carbon atoms: alkenyl groups such as ethenyl, 1-methylethenyl and 2-propenyl; and alkynyl groups such as ethynyl and 2-propynyl.

Illustrative examples of monovalent aromatic hydrocarbon groups which may have a substituent include the following groups of 6 to 20 carbon atoms, preferably 6 to 12 carbon atoms, and more preferably 6 carbon atoms: aryl groups such as phenyl and tolyl; aralkyl groups such as benzyl and 2-phenylethyl; and halogen-substituted aryl groups such as α,α,α-trifluorotolyl and chlorobenzyl.

Of these, $R^4$ is preferably methyl, ethyl, 3,3,3-trifluoropropyl or phenyl; more preferably methyl, ethyl or phenyl; and most preferably methyl.

The letter a is an integer from 1 to 2,000, preferably an integer from 10 to 1,800, and more preferably an integer from 20 to 1,500. When "a" is larger than 2,000, the organopolysiloxane compound has a high viscosity and is difficult to handle. The letter b is an integer from 1 to 1,999, preferably an integer from 0 to 1,000, and more preferably an integer from 0 to 100. When "b" is larger than 1,999, the organopolysiloxane compound has a high viscosity and is difficult to handle.

The respective recurring units may be randomly bonded.

Terminal Vinylene Group-Containing Organopolysiloxane Compound

The organopolysiloxane compound which is either linear or branched and has, as a partial structure, at least one unit of general formula (1) above is exemplified by the terminal vinylene group-containing organopolysiloxane compound of general formula (2) below

[Chemical Formula 33]

(2)
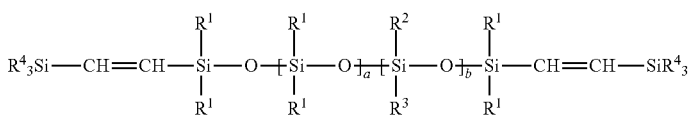

(wherein $R^1$ to $R^4$ and the letters a and b are as defined above, and the sum of a, b and x in the groups of formula (a) included as $R^2$ or $R^3$ is an integer from 1 to 2,000).

When such a terminal vinylene group-containing organopolysiloxane compound is used as the base polymer of an addition-curable silicone composition, improved control of the curing reaction rate and improved composition properties owing to the substituent effects of the triorganosilyl group substituted onto the vinyl group are further expected.

$R^1$ in above formula (2) can be exemplified by the same groups as $R^1$ is the earlier described formula (1). Of these, methyl, ethyl, 3,3,3-trifluoropropyl and phenyl groups are preferred, with methyl, ethyl and phenyl groups being more preferred.

$R^2$ in above formula (2) can be exemplified by the same groups as $R^2$ in the earlier described formula (1). Of these, methyl, ethyl, 3,3,3-trifluoropropyl, phenyl and groups of above formula (a) in which $R^4$ is methyl are preferred, with methyl, ethyl, phenyl and groups of above formula (a) in which $R^4$ is methyl being more preferred.

$R^3$ in above formula (2) can be exemplified by the same groups as $R^3$ in the earlier described formula (1). Of these, groups of above formula (a) in which $R^4$ is methyl are preferred.

$R^4$ in above formula (2) can be exemplified by the same groups as $R^4$ in the earlier described formula (1). Of these, methyl, ethyl, 3,3,3-trifluoropropyl and phenyl are preferred, with methyl ethyl and phenyl being more preferred, and methyl being especially preferred.

The letters a and b in formula (2) are the same as the letters a and b in the earlier described formula (1).

Also, in formula (2), the sum of a, b and x in the group of formula (a) included as $R^2$ or $R^3$ is an integer from 1 to 2,000, preferably an integer from 10 to 1,800, and more preferably an integer from 20 to 1,500. When the sum of a, b and x is more than 2,000, the organopolysiloxane compound has a high viscosity and is difficult to handle.

The respective recurring units may be randomly bonded.

Illustrative examples of the terminal vinylene group-containing organopolysiloxane compound of formula (2) include the following:

[Chemical Formula 34]

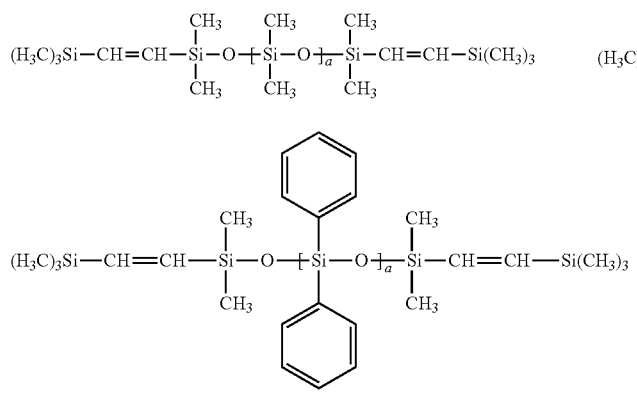

[Chemical Formula 35]

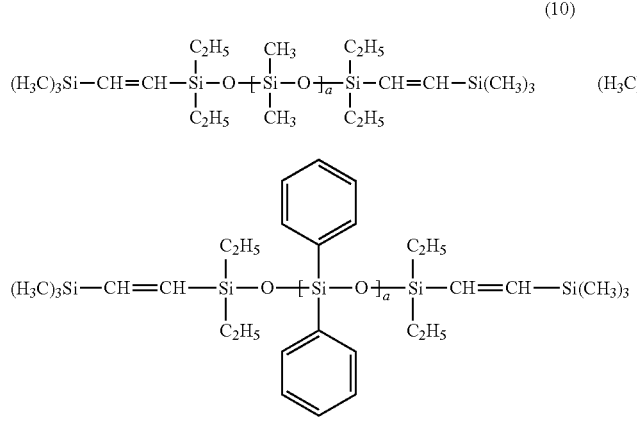

[Chemical Formula 36]

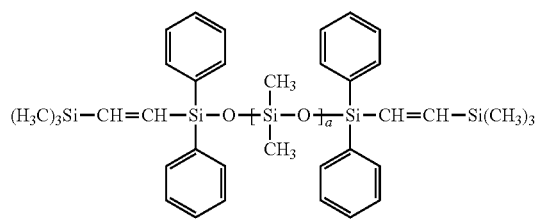

[Chemical Formula 37]
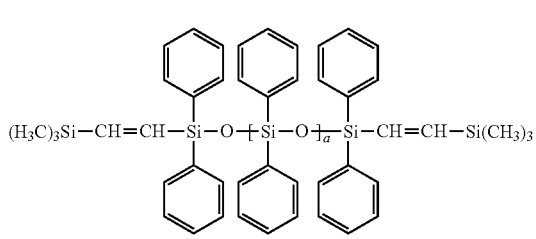
(15)
(16)
$(C_2H_5)_3Si-CH=CH-\underset{\underset{CH_3}{|}}{\overset{\overset{CH_3}{|}}{Si}}-O\underset{}{{+}}\underset{\underset{CH_3}{|}}{\overset{\overset{CH_3}{|}}{Si}}-O{\underset{}{{\, }}}_{a}\underset{\underset{CH_3}{|}}{\overset{\overset{CH_3}{|}}{Si}}-CH=CH-Si(C_2H_5)_3$
[Chemical Formula 38]
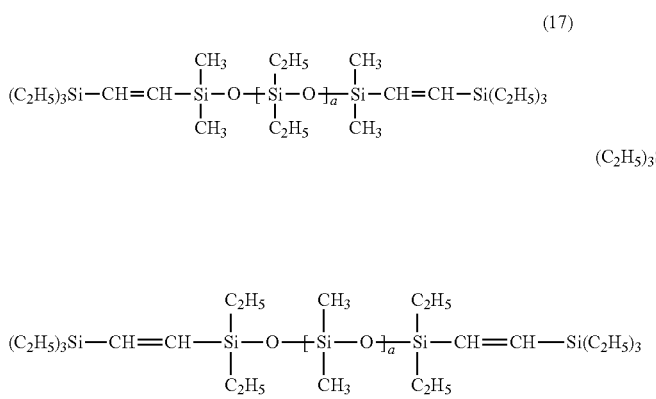
[Chemical Formula 39]
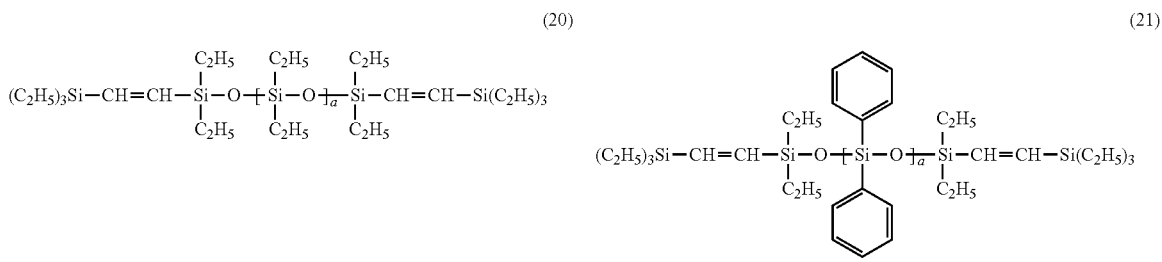
[Chemical Formula 40]
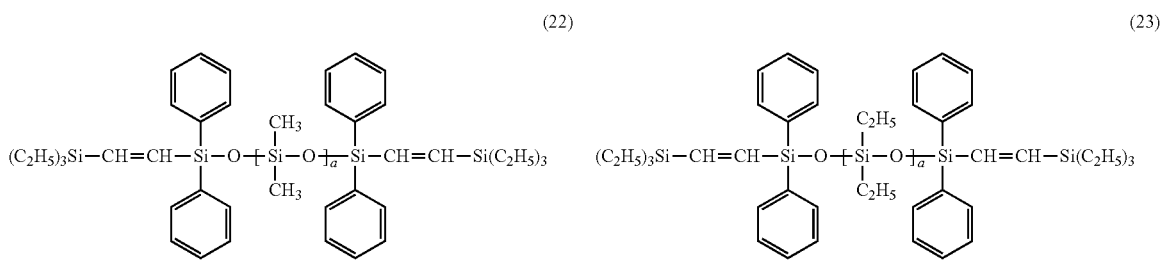
[Chemical Formula 41]
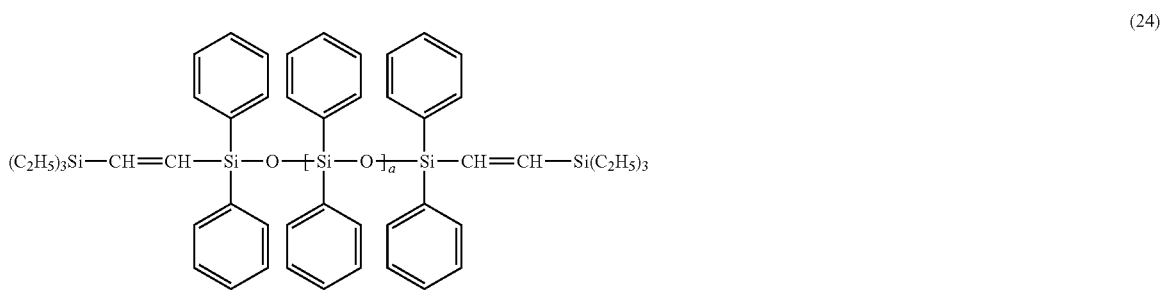

[Chemical Formula 42]
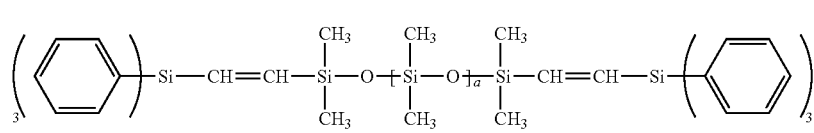  (25)
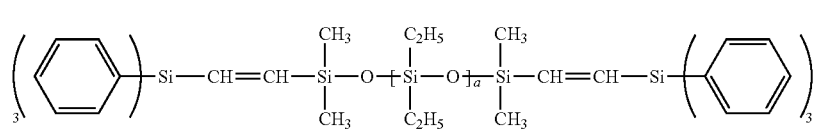  (26)
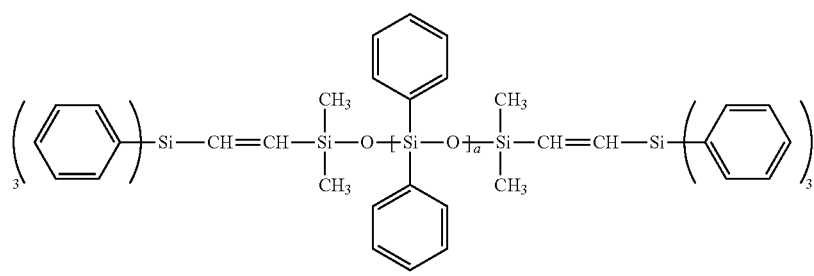  (27)
[Chemical Formula 43]
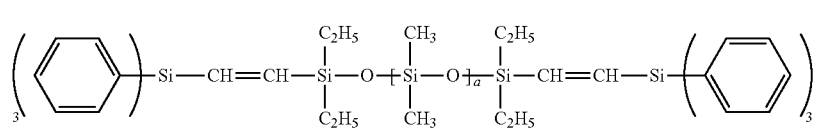  (28)
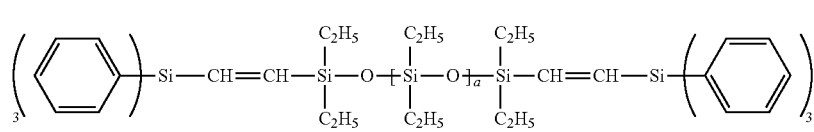  (29)
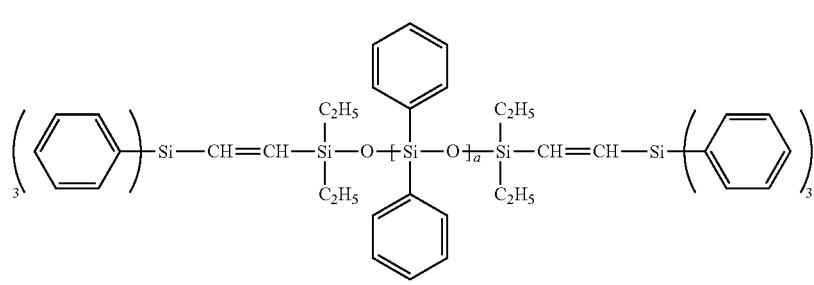  (30)
[Chemical Formula 44]
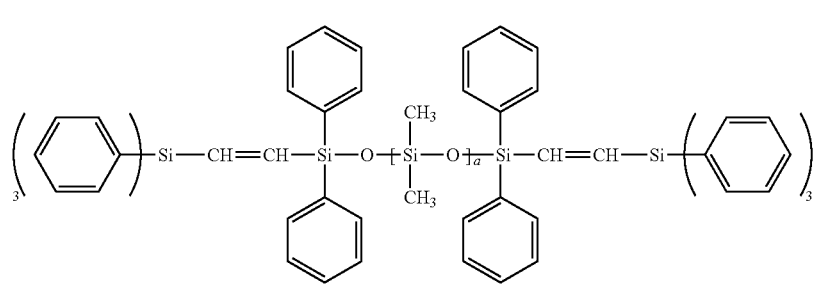  (31)

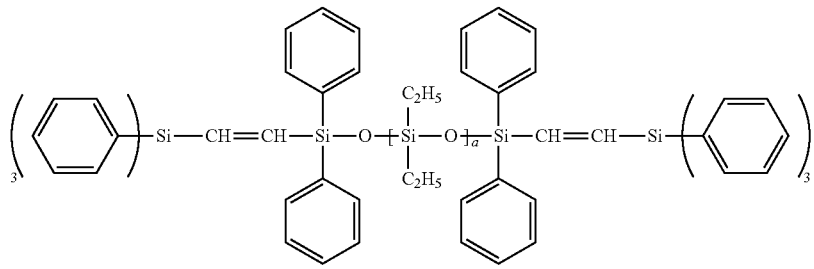

(32)

[Chemical Formula 45]

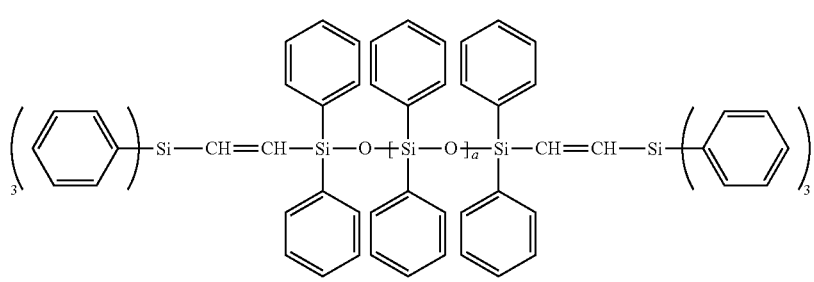

(33)

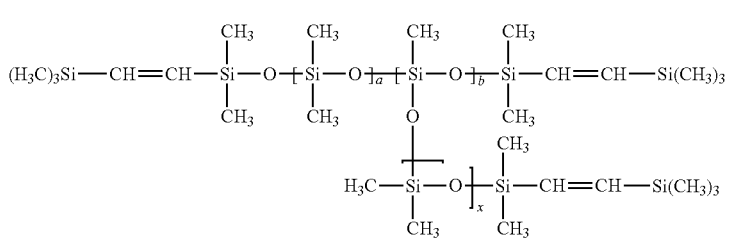

(34)

[Chemical Formula 46]

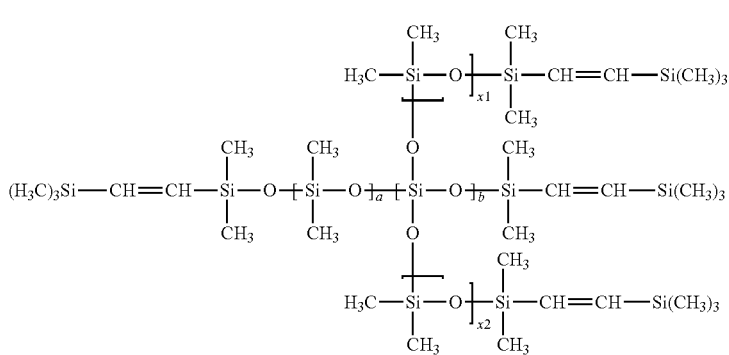

(35)

(wherein the letter a is an integer from 1 to 2,000, the letter b is an integer from 0 to 1,999, and x, x1 and x2 are each integers from 0 to 1,998, with the sum of a, b, x, x1 and x2 in each compound being an integer from 1 to 2,000).

The viscosity of this terminal vinylene group-containing to organopolysiloxane compound is not particularly limited, although the viscosity at 25° C. is preferably from 10 to 1,000,000 mPa·s, and more preferably from 100 to 100,000 mPa·s. In this invention, the viscosity can be measured with a rotational viscometer.

The terminal vinylene group-containing organopolysiloxane compound of the invention can be prepared by, for example, the following method for preparing terminal vinylene group-containing organopolysiloxane compounds.

Method for Preparing Terminal Vinylene Group-Containing Organopolysiloxane Compounds The terminal vinylene group-containing organopolysiloxane compound (2) of the invention

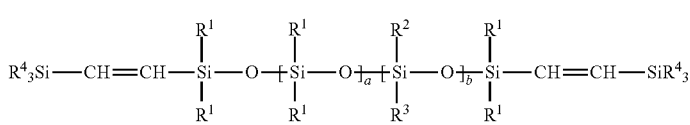
(2)

is prepared by carrying out an equilibration reaction between a compound of general formula (3) below

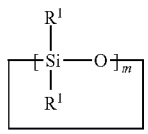
(3)

and a compound of general formula (4) below

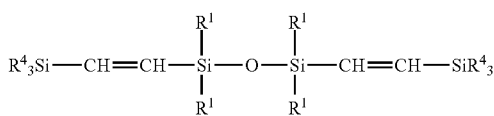
(4)

or a compound of general formula (5) below $$R^{20}_{4-y}\text{—Si—}R^{30}_{y} \quad (5)$$

in the presence of an acidic or basic catalyst. In formulas (2) to (5), $R^1$ to $R^4$ and the letters a and b are as defined above, $R^{20}$ and $R^{30}$ are subsequently described, the letter m is an integer from 3 to 30, and the letter y is 3 or 4.

The terminal vinylene group-containing organopolysiloxane compound of formula (2) can be prepared by this preparation method according to the invention. Moreover, adjusting the degree of polymerization by varying the molar ratio between the cyclic organosiloxane compound of formula (3) and the terminal vinylene group-containing organodisiloxane compound of formula (4) or the organosiloxane compound of formula (5) is easy, and the productivity is also excellent.

The main starting materials in the invention are exemplified by cyclic organosiloxane compounds of above formula (3).

$R^1$ in formula (3) may be exemplified by the same groups as $R^1$ in the earlier described formulas (1) and (2). Of these, methyl, ethyl, 3,3,3-trifluoropropyl and phenyl are preferred, with methyl, ethyl and phenyl being more preferred.

Also, the letter m is an integer from 3 to 20, preferably an integer from 3 to 15, and more preferably an integer from 3 to 10.

Illustrative examples of cyclic organosiloxane compounds of above formula (3) include hexamethylcyclotrisiloxane, octamethylcyclotetrasiloxane, decamethylcyclopentasiloxane, dodecamethylcyclohexasiloxane, hexaethylcyclotrisiloxane, octaethylcyclotetrasiloxane, hexaphenylcyclotrisiloxane and octaphenylcyclotetrasiloxane.

Exemplary end-group precursors in the invention include terminal vinylene group-containing organodisiloxane compounds of above formula (4).

$R^1$ in above formula (4) may be exemplified by the same groups as $R^1$ in the earlier described formulas (1) and (2). Of these, methyl, ethyl, 3,3,3-trifluoropropyl and phenyl are preferred, with methyl, ethyl and phenyl being more preferred.

$R^4$ in above formula (4) may be exemplified by the same groups as $R^4$ in the earlier described formulas (1) and (2). Of these, methyl, ethyl, 3,3,3-trifluoropropyl and phenyl are preferred, with methyl, ethyl and phenyl being more preferred.

Illustrative examples of the terminal vinylene group-containing organodisiloxane compound of above formula (4) include
1,1,3,3-tetramethyl-1,3-bis[2-(trimethylsilyl)ethenyl]-(E,E)-disiloxane,
1,1,3,3-tetraethyl-1,3-bis[2-(trimethylsilyl)ethenyl]-(E,E)-disiloxane,
1,1,3,3-tetraphenyl-1,3-bis[2-(trimethylsilyl)ethenyl]-(E,E)-disiloxane,
1,1,3,3-tetramethyl-1,3-bis[2-(triethylsilyl)ethenyl]-(E,E)-disiloxane,
1,1,3,3-tetraethyl-1,3-bis[2-(triethylsilyl)ethenyl]-(E,E)-disiloxane,
1,1,3,3-tetraphenyl-1,3-bis[2-(triethylsilyl)ethenyl]-(E,E)-disiloxane,
1,1,3,3-tetramethyl-1,3-bis[2-(triphenylsilyl)ethenyl]-(E,E)-disiloxane,
1,1,3,3-tetraethyl-1,3-bis[2-(triphenylsilyl)ethenyl]-(E,E)-disiloxane and
1,1,3,3-tetraphenyl-1,3-bis[2-(triphenylsilyl)ethenyl]-(E,E)-disiloxane.

The compound of above formula (4) can be prepared by a hydrosilylation reaction between compounds of formulas (4a) and formula (4b) below

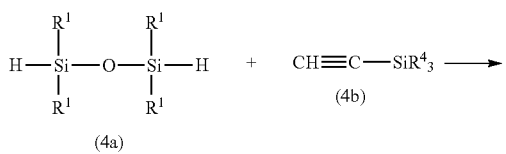

compound of formula (4)

(wherein $R^1$ and $R^4$ are the same as above).

This hydrosilylation reaction may be carried out in the usual manner.

Precursors for the end groups and branched chains in the invention are exemplified by organosiloxane compounds of above formula (5).

$R^{20}$ in formula (5) may be a hydrogen atom, a monovalent hydrocarbon group of 1 to 20 carbon atoms which may have a substituent, or a group of general formula (a0) below

[Chemical Formula 49]

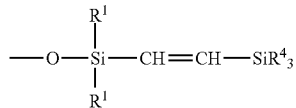
(a0)

(wherein $R^1$ and $R^4$ are as defined above).

Monovalent hydrocarbon groups of 1 to 20 carbon atoms which may have a substituent that serve as $R^{20}$ are exemplified in the same way as $R^2$ in formulas (1) and (2) above. Of these, methyl, ethyl, 3,3,3-trifluoropropyl, phenyl or a group of above formula (a0) in which $R^4$ is methyl are preferred, with methyl, ethyl, phenyl or a group of above formula (a0) in which $R^4$ is methyl being more preferred.

$R^{30}$ in above formula (5) is preferably a group of above formula (a0) in which $R^4$ is methyl.

The compound of formula (5) can be obtained by reacting a compound of above formula (4) with a compound of formula (5i) below

[Chemical Formula 50]

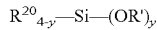
(5i)

(wherein $R^{20}$ is as defined above; y is 3 or 4, and R' is an alkoxy group of 1 to 4 carbon atoms).

In this case, the compound of formula (5) can be obtained via a reaction that forms a compound of formula (5ii) below

[Chemical Formula 51]

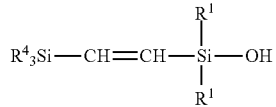
(5ii)

(wherein $R^1$ and $R^4$ are as defined above) from a compound of formula (4) in the presence of an alcohol such as methanol by the addition of concentrated sulfuric acid at a temperature of from about 0 to about 25° C., and a condensation reaction involving the hydrolysis of an alkoxysilane of formula (5i) and dehydration or dealcoholization with the compound of formula 5(ii).

Illustrative examples of the organosiloxane compound of formula (5) include the following.

[Chemical Formula 52]

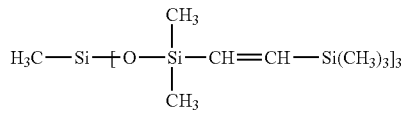
(5a)

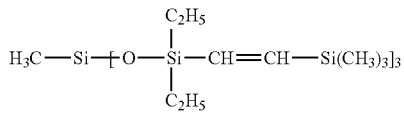
(5b)

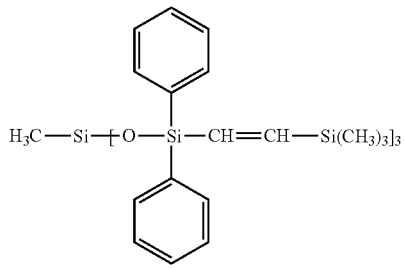
(5c)

[Chemical Formula 53]

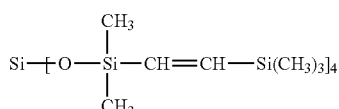
(5d)

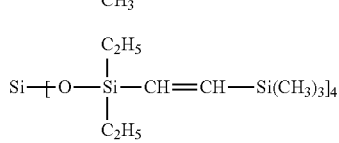
(5e)

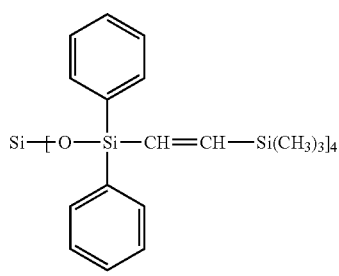
(5f)

The amounts (ratio) in which the cyclic organosiloxane compound of formula (3) and the terminal vinylene group-containing organodisiloxane of formula (4) or the organosiloxane compound of formula (5) serving as the starting materials are used may be suitably selected according to the degree of polymerization of the terminal vinylene group-containing organopolysiloxane compound of formula (2) designed as described above.

The preparation method of the invention is carried out by an equilibration reaction which, aside from the use of the terminal vinylene group-containing organodisiloxane compound of formula (4) or the organosiloxane compound of formula (5) and aside from having an acidic or basic catalyst be present together with this and a cyclic organosiloxane compound of formula (3), is itself commonly known. The equilibration reaction may be carried out at, for example from 10 to 180° C. and without using a solvent. Alternatively, it may be carried out using a suitable solvent such as toluene or xylene.

Examples of acidic catalysts include sulfuric acid and trifluoromethanesulfonic acid. Examples of basic catalysts includes potassium hydroxide, sodium hydroxide, potassium siliconate and sodium siliconate. By using these catalysts, the equilibration reaction can be made to proceed stably.

Generally, when using an acidic catalyst such as sulfuric acid or trifluoromethanesulfonic acid as the catalyst, the equilibration reaction is carried out at a relatively low temperature of, for example, from 10 to 150° C., and preferably from 20 to 100° C., for 30 minutes to 12 hours, and especially 1 hour to 8 hours. The acidic catalyst is used in a weight ratio, based on all the starting organosiloxane compounds, of from 1,000 to 100,000 ppm, and preferably from 10,000 to 100,000 ppm.

On the other hand, when using a basic catalyst such as potassium hydroxide, sodium hydroxide, potassium siliconate or sodium siliconate as the catalyst, the equilibration reaction is carried out at a relatively high temperature of, for example from 50 to 180° C., and preferably from 80 to 160° C., for 1 hour to 24 hours, and especially 2 hours to 12 hours. The basic catalyst is used in a weight ratio, based on all the starting organosiloxane compounds, of from 1 to 1,000 ppm, and preferably 10 to 500 ppm.

Following reaction completion, the target terminal vinylene group-containing organopolysiloxane compound can be obtained by carrying out catalyst neutralization and filtration, then subjecting the filtrate to purification by distillation or the like.

In the inventive method for preparing a terminal vinylene group-containing organopolysiloxane compound, by selecting the amounts of the cyclic organosiloxane compound of formula (3) and the terminal vinylene group-containing organodisiloxane compound of formula (4) or the organosiloxane compound of formula (5) in such a way that, in a typical example, the molecular composition of the terminal vinylene group-containing organopolysiloxane compound that is produced consists of 0.05 to 99.90 mol % of $R^1{}_2SiO_{2/2}$ units, 0 to 99.85 mol % of $R^2R^3SiO_{2/2}$ units and 0.1 to 66.67 mol % of $R^4{}_3SiHC\!\!=\!\!CH(R^1)_2SiO_{1/2}$ units (wherein $R^1$ to $R^4$ are as defined above), the sum of these siloxane units being 100 mol %, there can be obtained a terminal vinylene group-containing organopolysiloxane compound of formula (2) having such a molecular composition.

With the use of a terminal vinylene group-containing organopolysiloxane compound having such a molecular structure as the base polymer of an addition-curable silicone composition, improved control of the curing reaction rate and improved composition properties are expected.

The above method of preparation is useful in that a terminal vinylene group-containing organopolysiloxane compound having the target degree of polymerization can be easily prepared.

This terminal vinylene group-containing organopolysiloxane compound of the invention can be used as the base polymer of an addition-curable silicone composition.

The addition-curable silicone composition in which the inventive terminal vinylene group-containing organopolysiloxane compound is used includes as essential ingredients:

(A) 100 parts by weight of a terminal vinylene group-containing organopolysiloxane compound of general formula (2A) below

[Chemical Formula 54]

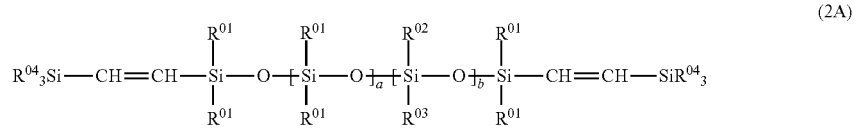

(2A)

(wherein $R^{01}$ is a monovalent hydrocarbon group of 1 to 20 carbon atoms which may have a substituent, each $R^{01}$ being the same or different; $R^{02}$ is a monovalent hydrocarbon group of 1 to 20 carbon atoms which may have a substituent, or a group of general formula (a') below

[Chemical Formula 55]

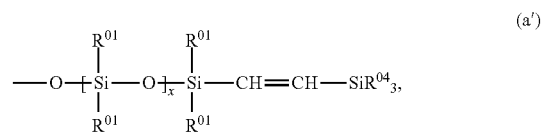

(a')

each $R^{02}$ being the same or different; the letter x is an integer from 0 to 1,998; $R^{03}$ is a group of above formula (a'), each $R^{03}$ being the same or different; $R^{04}$ is a monovalent hydrocarbon group of 1 to 20 carbon atoms which may have a substituent, each $R^{04}$ being the same or different; the letter a is an integer from 1 to 2,000; the letter b is an integer from 0 to 1,999; and the sum of a, b and x is an integer from 1 to 2,000), (B) an organohydrogenpolysiloxane compound having two or more silicon atom-bonded hydrogen atoms (SiH groups) per molecule, in an amount such that the number of SiH groups in component (B) relative to the sum of the number of aliphatic unsaturated hydrocarbon groups in component (A) is from 0.5 to 5, and (C) an effective amount of a hydrosilylation catalyst; and preferably includes also:

(D) an effective amount of one or more regulator selected from the group consisting of acetylene compounds, nitrogen compounds, organophosphorus compounds, oxime compounds and organochlorine compounds.

Component (A), the base polymer of this composition, is a terminal vinylene group-containing organopolysiloxane compound of general formula (2A) below.

[Chemical Formula 56]

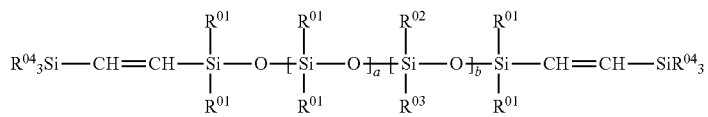
(2A)

(wherein $R^{01}$ is a monovalent hydrocarbon group of 1 to 20 carbon atoms which may have a substituent, each $R^{01}$ being the same or different; $R^{02}$ is a monovalent hydrocarbon group of 1 to 20 carbon atoms which may have a substituent, or a group of general formula (a') below

[Chemical Formula 57]

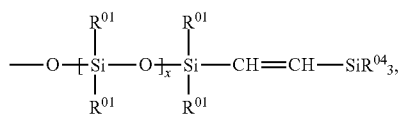
(a')

each $R^{02}$ being the same or different; the letter x is an integer from 0 to 1,998; $R^{03}$ is a group of above formula (a'), each $R^{03}$ being the same or different; $R^{04}$ is a monovalent hydrocarbon group of 1 to 20 carbon atoms which may have a substituent, each $R^{04}$ being the same or different; the letter a is an integer from 1 to 2,000; the letter b is an integer from 0 to 1,999; and the sum of a, b and x is an integer from 1 to 2,000).

This organopolysiloxane compound is characterized by having, on a terminal silicon atom, a vinyl group that has been substituted with a triorganosilyl group. When such an organopolysiloxane compound is used as the base polymer of an addition-curable silicone composition, an excellent shelf stability and heat resistance are manifested on account of the substituent effects of the triorganosilyl group substituted onto the vinyl group.

$R^{01}$ in above formula (2A) is a monovalent hydrocarbon group of 1 to 20 carbon atoms that may have a substituent, preferred examples of which include monovalent saturated aliphatic hydrocarbon groups which may have a substituent, monovalent unsaturated aliphatic hydrocarbon groups which may have a substituent, and monovalent aromatic hydrocarbon groups (including aromatic heterocycles) which may have a substituent. A monovalent saturated aliphatic hydrocarbon group which may have a substituent or a monovalent aromatic hydrocarbon group which may have a substituent is more preferred, and a monovalent saturated aliphatic hydrocarbon group which may have a substituent is especially preferred.

Illustrative examples of monovalent saturated aliphatic hydrocarbon groups which may have a substituent include the following groups of 1 to 20 carbon atoms, preferably 1 to 12 carbon atoms, and more preferably 1 to 6 carbon atoms: linear alkyl groups such as methyl, ethyl, propyl, butyl, pentyl, hexyl, heptyl and octyl; branched alkyl groups such as isopropyl, isobutyl, tert-butyl, isopentyl and neopentyl; cycloalkyl groups such as cyclopentyl, cyclohexyl and cycloheptyl; and halogen-substituted alkyl groups such as chloromethyl, 3-chloropropyl, 3,3,3-trifluoropropyl and bromopropyl.

Illustrative examples of monovalent unsaturated aliphatic hydrocarbon groups which may have a substituent include the following groups of 2 to 20 carbon atoms, preferably 2 to 12 carbon atoms, and more preferably 2 to 6 carbon atoms: alkenyl groups such as ethenyl, 1-methylethenyl and 2-propenyl; and alkynyl groups such as ethynyl and 2-propynyl.

Illustrative examples of monovalent aromatic hydrocarbon groups which may have a substituent include the following groups of 6 to 20 carbon atoms, preferably 6 to 12 carbon atoms, and more preferably 6 carbon atoms: aryl groups such as phenyl and tolyl; aralkyl groups such as benzyl and 2-phenylethyl; and halogen-substituted aryl groups such as α,α,α-trifluorotolyl and chlorobenzyl.

Of these, $R^{01}$ is preferably methyl, ethyl, 3,3,3-trifluoropropyl or phenyl; more preferably methyl, ethyl or phenyl; and most preferably methyl.

$R^{02}$ in above formula (2A) is a monovalent hydrocarbon group of 1 to 20 carbon atoms which may have a substituent, or a group of general formula (a') below

[Chemical Formula 58]

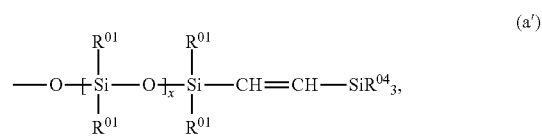
(a')

(wherein $R^{01}$ and $R^{04}$ are as defined above; and x is an integer from 0 to 1,998, preferably from 0 to 1,800, and more preferably from 0 to 1,500). Preferred examples include monovalent saturated aliphatic hydrocarbon groups which may have a substituent, monovalent unsaturated aliphatic hydrocarbon groups which may have a substituent, monovalent aromatic hydrocarbon groups (including aromatic heterocycles) which may have a substituent, and groups of formula (a'). A monovalent saturated aliphatic hydrocarbon group which may have a substituent, a monovalent aromatic hydrocarbon group which may have a substituent or a group of formula (a') is more preferred, with a monovalent saturated aliphatic hydrocarbon group which may have a substituent or a group of formula (a') being especially preferred.

Illustrative examples of monovalent saturated aliphatic hydrocarbon groups which may have a substituent include the following groups of 1 to 20 carbon atoms, preferably 1 to 12 carbon atoms, and more preferably 1 to 6 carbon atoms: linear alkyl groups such as methyl, ethyl, propyl, butyl, pentyl, hexyl, heptyl and octyl; branched alkyl groups such as isopropyl, isobutyl, tert-butyl, isopentyl and neopentyl; cycloalkyl groups such as cyclopentyl, cyclohexyl and cycloheptyl; and halogen-substituted alkyl groups such as chloromethyl, 3-chloropropyl, 3,3,3-trifluoropropyl and bromopropyl.

Illustrative examples of monovalent unsaturated aliphatic hydrocarbon groups which may have a substituent include the following groups of 2 to 20 carbon atoms, preferably 2 to 12 carbon atoms, and more preferably 2 to 6 carbon atoms: alkenyl groups such as ethenyl, 1-methylethenyl and 2-propenyl; and alkynyl groups such as ethynyl and 2-propynyl.

Illustrative examples of monovalent aromatic hydrocarbon groups which may have a substituent include the following groups of 6 to 20 carbon atoms, preferably 6 to 12 carbon atoms, and more preferably 6 carbon atoms: aryl groups such as phenyl and tolyl; aralkyl groups such as benzyl and 2-phenylethyl; and halogen-substituted aryl groups such as α,α,α-trifluorotolyl and chlorobenzyl.

Of these, $R^{02}$ is preferably methyl, ethyl, 3,3,3-trifluoropropyl, phenyl or a group of formula (a') in which $R^{04}$ is methyl; more preferably methyl, ethyl, phenyl or a group of formula (a') in which $R^{04}$ is methyl; and most preferably methyl or a group of formula (a') in which $R^{04}$ is methyl.

$R^{04}$ in above formula (2A) is a group of above formula (a'). $R^{03}$ is preferably a group of formula (a') in which $R^{04}$ is methyl.

$R^{04}$ in above formula (2A) is a monovalent hydrocarbon group of 1 to 20 carbon atoms which may have a substituent. Preferred examples include monovalent saturated aliphatic hydrocarbon groups which may have a substituent, monovalent unsaturated aliphatic hydrocarbon groups which may have a substituent, and monovalent aromatic hydrocarbon groups (including aromatic heterocycles) which may have a substituent. A monovalent saturated aliphatic hydrocarbon group which may have a substituent or a monovalent aromatic hydrocarbon group which may have a substituent is more preferred, and a monovalent saturated aliphatic hydrocarbon group which may have a substituent is especially preferred.

Illustrative examples of monovalent saturated aliphatic hydrocarbon groups which may have a substituent include the following groups of 1 to 20 carbon atoms, preferably 1 to 12 carbon atoms, and more preferably 1 to 6 carbon atoms: linear alkyl groups such as methyl, ethyl, propyl, butyl, pentyl, hexyl, heptyl and octyl; branched alkyl groups such as isopropyl, isobutyl, tert-butyl, isopentyl and neopentyl; cycloalkyl groups such as cyclopentyl, cyclohexyl and cycloheptyl; and halogen-substituted alkyl groups such as chloromethyl, 3-chloropropyl, 3,3,3-trifluoropropyl and bromopropyl.

Illustrative examples of monovalent unsaturated aliphatic hydrocarbon groups which may have a substituent include the following groups of 2 to 20 carbon atoms, preferably 2 to 12 carbon atoms, and more preferably 2 to 6 carbon atoms: alkenyl groups such as ethenyl, 1-methylethenyl and 2-propenyl; and alkynyl groups such as ethynyl and 2-propynyl.

Illustrative examples of monovalent aromatic hydrocarbon groups which may have a substituent include the following groups of 6 to 20 carbon atoms, preferably 6 to 12 carbon atoms, and more preferably 6 carbon atoms: aryl groups such as phenyl and tolyl; aralkyl groups such as benzyl and 2-phenylethyl; and halogen-substituted aryl groups such as α,α,α-trifluorotolyl and chlorobenzyl.

Of these, $R^{04}$ is preferably methyl, ethyl, 3,3,3-trifluoropropyl or phenyl; more preferably methyl, ethyl or phenyl; and most preferably methyl.

In formula (2A), the letter a is an integer from 1 to 2,000, preferably an integer from 10 to 1,800, and more preferably at integer from 20 to 1,500. When "a" is larger than 2,000, the organopolysiloxane compound has a high viscosity and is difficult to handle. The letter b is an integer of from 0 to 1,999, preferably an integer of from 0 to 1,000, and more preferably an integer from 0 to 100. When "b" is larger than 1,999, the organopolysiloxane compound has a high viscosity and is difficult to handle. The sum of a, b, and of x in groups of formula (a') included as $R^{02}$ or $R^{03}$ is an integer from 1 to 2,000, preferably an integer from 10 to 1,800, and more preferably an integer from 20 to 1,500. When the sum of a, b and x is greater than 2,000, the organopolysiloxane compound has a high viscosity and is difficult to handle. The respective recurring units may be randomly bonded.

Illustrative examples of the terminal vinylene group-containing organopolysiloxane compound of formula (2A) include those of formulas (7) to (9) above.

Component (B), which serves as a crosslinking agent in this composition, is an organohydrogenpolysiloxane having 2 or more, preferably 3 or more, especially 3 to 100, and more especially 3 to 20, silicon atom-bonded hydrogen atoms (i.e., SiH groups) per molecule. This organohydrogenpolysiloxane may be any for which the SiH groups on the molecule are capable of undergoing an addition reaction with above-described component (A) in the presence of a platinum family metal catalyst to form a crosslinked structure. So long as the organohydrogenpolysiloxane has this quality, the molecular structure is not particularly limited and may be, for example, linear, branched, cyclic, or linear with a partially branched or cyclic structure. The molecular structure is preferably linear or cyclic.

It is desirable for the organohydrogenpolysiloxane to have a kinematic viscosity at 25° C. of from 1.0 to 1,000 mm²/s, and preferably from 10 to 100 mm²/s. When the kinematic viscosity is below this lower limit, the physical properties of the composition may decrease. On the other hand, when it is higher than this upper limit, the composition may lack extensibility. In this invention, the kinematic viscosity is a value measured at 25° C. using an Ubbelohde-Ostwald viscometer.

The silicon atom-bonded organic group in this organohydrogenpolysiloxane is exemplified by monovalent hydrocarbon groups other than aliphatic unsaturated hydrocarbon groups, and especially substituted or unsubstituted monovalent hydrocarbon groups of 1 to 20, and preferably 1 to 12, carbon atoms. Illustrative examples include alkyl groups such as methyl, ethyl, propyl, butyl, hexyl and dodecyl; aryl groups such as phenyl; aralkyl groups such as 2-phenylethyl and 2-phenylpropyl; any of these group in which some or all of the hydrogen atoms are substituted with halogen atoms (e.g., fluorine, bromine, chlorine), cyano groups or the like, such as chloromethyl, chloropropyl, bromoethyl, trifluoropropyl or cyanoethyl; and epoxy ring-containing organic groups (glycidyl groups or glycidyloxy-substituted alkyl groups) such as 2-glycidoxyethyl, 3-glycidoxypropyl and 4-glycidoxybutyl. Such organohydrogenpolysiloxanes may be used singly or two or more may be used in admixture.

The organohydrogenpolysiloxane has, for example, the following average compositional formula (iii).

$$R^{06}{}_d H_e SiO_{(4-d-e)/2} \qquad (iii)$$

In the formula, each $R^{06}$ is independently a substituted or unsubstituted monovalent hydrocarbon group of 1 to 20, and preferably 1 to 12, carbon atoms, other than aliphatic unsaturated hydrocarbon groups, and is exemplified by the organic groups mentioned above. The letter d is a positive number from 0.7 to 2.1, and preferably from 0.8 to 2.05; the letter e is a positive number of from 0.001 to 1.0, and preferably from 0.005 to 1.0; and the sum d+e is a number from 0.8 to 3.0, and preferably from 1.0 to 2.5. The weight-average molecular weight (polystyrene-equivalent weight-average molecular weight obtained by gel permeation chromatography) of the organohydrogenpolysiloxane is preferably from 100 to 30,000, and more preferably from 500 to 10,000. The structure of the organohydrogenpolysiloxane is not particularly limited, and may be linear, branched, cyclic, or linear with a partially branched or cyclic structure.

The amount of (B) organohydrogenpolysiloxane is such that the number of SiH groups in component (B) relative to the sum of the number of aliphatic unsaturated hydrocarbon groups in component (A) is from 0.5 to 5, preferably from 0.8 to 3, and more preferably from 1 to 2. At an amount of component (B) below this lower limit, the addition reaction may not fully proceed and crosslinking may be inadequate. On the other hand, at an amount above this upper limit, the crosslinked structure may lack uniformity and the shelf stability of the composition may greatly worsen.

Component (C) is a hydrosilylation catalyst that functions to promote the above-described addition reaction. The hydrosilylation catalyst may be a hitherto known catalyst that is used in addition reactions. Examples include platinum-based, palladium-based and rhodium-based catalysts. Of these, platinum or platinum compounds, which are relatively easily acquired, are preferred. Illustrative examples include uncombined platinum, platinum black, chloroplatinic acid, platinum-olefin complexes, platinum-alcohol complexes and platinum coordination compounds. The hydrosilylation catalyst may be used singly, or two or more may be used in combination.

The amount of component (C) included is an effective amount as a catalyst; that is, the effective amount required to promote the addition reaction and to induce curing of the inventive composition. In particular, the amount (based on the weight of the platinum family metal atoms) relative to component (A) is preferably from 0.1 to 500 ppm, and more preferably from 1 to 200 ppm. At a catalyst amount smaller than this lower limit value, the effects as a catalyst may not be obtained. On the other hand, at a catalyst amount in excess of this upper limit value, there is no further increase in the catalyst effects and so this is uneconomical and thus undesirable.

Component (D) is a regulator which functions to keep hydrosilylation reactions from proceeding at room temperature and thus extends the shelf life and pot life of the composition. Hitherto known regulators used in addition-curable silicone compositions may be used as the regulator. Illustrative examples include acetylene compounds such as acetylene alcohols (e.g., 1-ethynyl-1-cyclohexanol, 3,5-dimethyl-1-hexyn-3-ol), various types of nitrogen compounds such as tributylamine, tetramethylethylenediamine and benzotriazole, organophosphorus compounds such as triphenylphosphine, oxime compounds and organochlorine compounds.

The amount of component (D) per 100 parts by weight of component (A) is from 0.05 to 0.6 part by weight, and preferably from 0.1 to 0.5 part by weight. At an amount of regulator below this lower limit, the sufficient shelf life and pot life desired may not be obtained; at an amount of regulator greater than this upper limit, the curability of the silicone composition may decrease. The regulator, in order to improve dispersibility in the silicone composition, may be used after dilution with toluene or the like.

The silicone composition of the invention may additionally include component (E): at least one inorganic filler selected from the group consisting of metals, metal oxides, metal hydroxides, metal nitrides, metal carbonates and carbon allotropes.

The purpose of the inorganic filler serving as component (E) is to impart various properties, such as thermal conductivity, heat resistance, reinforcing properties and electrical conductivity, to the inventive composition. The inorganic filler is preferably composed of at least one type of material selected from the group consisting of metals, metal oxides, metal hydroxides, metal nitrides, metal carbonates and carbon allotropes. Illustrative examples include aluminum, silver, copper, metallic silicon, alumina, zinc oxide, magnesium oxide, silicon dioxide, cerium oxide, iron oxide, aluminum hydroxide, cerium hydroxide, aluminum nitride, boron nitride, silicon carbide, diamond, graphite, carbon nanotubes and graphene. The use of aluminum, alumina, zinc oxide or boron nitride is preferred for imparting thermal conductivity to the composition, the use of cerium oxide, cerium hydroxide or iron oxide is preferred for imparting heat resistance, the use of silicon dioxide is preferred for imparting reinforcing properties, and the use of silver or copper is preferred for imparting electrical conductivity.

When the inorganic filler has an average particle size larger than 100 μm, the resulting composition may lack uniformity. Therefore, the average particle size is in a range of up to 100 μm, and preferably in a range of up to 40 μm. The average particle size may be determined as, for example, the weight-average value (or median size) in particle size distribution measurement by the laser diffraction method.

The inorganic filler has a particle shape that is not particularly limited, and may be, for example, spherical, irregular, needle-like or plate-like.

When such component (E) ingredients are included in an amount greater than 2,000 parts by weight per 100 parts by weight of component (A), the composition may have a high viscosity and become difficult to handle, and a uniform composition may not be obtained. Hence, it is desirable to set the amount in a range of up to 2,000 parts by weight, and preferably up to 1,500 parts by weight. When component (E) is included, it is desirable for the amount to be at least 0.1 part by weight, and preferably at least 1.0 part by weight.

The silicone composition of the invention may additionally include either or both of: (F) a hydrolyzable organopolysiloxane compound of general formula (i) below

[Chemical Formula 59]

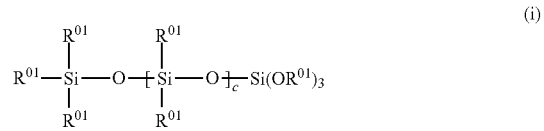

(i)

(wherein $R^{01}$ is a monovalent hydrocarbon group of 1 to 20 carbon atoms which may have a substituent, each $R^{01}$ being the same or different; and the letter c is an integer from 5 to 100), and (G) a hydrolyzable organosilane compound of general formula (ii) below

[Chemical Formula 60]

$$R^{05}-Si(OR^{01})_3 \qquad (ii)$$

(wherein $R^{01}$ is a monovalent hydrocarbon group of 1 to 20 carbon atoms which may have a substituent, each $R^{01}$ being the same or different; and $R^{05}$ is a monovalent hydrocarbon group of 1 to 20 carbons which may have a substituent).

The hydrolyzable organopolysiloxane compound of is component (F) and the hydrolyzable organosilane compound of component (G) are used to treat the surface of the inorganic filler. These compounds not only help to increase the packing of filler, they also discourage agglomeration between the filler particles by coating the surface of the filler. Moreover, because this effect persists even at high temperature, these compounds also enhance the heat resistance of the inventive silicone composition.

$R^{01}$ in above formulas (i) and (ii) is exemplified in the same way as the $R^{01}$ mentioned earlier in the specification, with methyl, ethyl, 3,3,3-trifluoropropyl and phenyl groups being preferred, methyl, ethyl and phenyl groups being more preferred, and a methyl group being especially preferred.

$R^{05}$ in above formula (ii) is exemplified in the same way as the $R^{01}$ mentioned earlier in the specification, with a unsubstituted linear monovalent saturated aliphatic hydrocarbon group of 4 to 20 carbon atoms being preferred, an unsubstituted linear monovalent saturated aliphatic hydrocarbon group of 6 to 14 carbon atoms being more preferred, and an unsubstituted linear monovalent saturated aliphatic hydrocarbon group of 6 to 12 carbons atoms being especially preferred.

When the hydrolyzable organopolysiloxane compound of component (F) is included, at an amount of addition in the silicone composition that is too large, oil bleeding tends to arise and the curing reaction may not sufficiently proceed. Therefore, the amount of addition is set to preferably from 1 to 200 parts by weight, and more preferably from 5 to 100 parts by weight, per 100 parts by weight of component (A).

When the hydrolyzable organosilane compound of component (G) is included at an amount of addition in the silicone composition that is too large, oil bleeding tends to arise or this may invite void formation. Accordingly, the amount of addition is set to preferably from 0.1 to 10 parts by weight, and more preferably from 0.1 to 8 parts by weight, per 100 parts by weight of component (A).

The silicone composition of the invention may also include an organo(poly)siloxane lacking reactivity, such as methylpolysiloxane, for the purpose of adjusting the elastic modulus and viscosity of the composition. Moreover, to prevent deterioration, the silicone composition may also optionally include a hitherto known antioxidant such as 2,6-di-t-butyl-4-methylphenol. Tackifiers, dyes, pigments, flame retardants, precipitation inhibitors, thixotropy modifiers and the like may also be optionally included.

Next, methods for preparing the silicone composition of the invention are described, although the invention is not limited to these.

To prepare the silicone composition of the invention, use can be made of a method that mixes together components (A) to (C) and, optionally, components (D), (E), (F) and (G) and other ingredients using a mixer such as THINKY MIXER (a registered trademark of Thinky KK), Trimix, Twinmix or Planetary Mixer (all registered trademarks of mixers manufactured by Inoue Mfg., Inc.), Ultra Mixer (registered trademark of mixers manufactured by Mizuho Industrial Co., Ltd.) or HIVIS DISPER MIX (registered trademark of mixers manufactured by Tokushu Kika Kogyo KK), or by manual mixing using a spatula or the like.

The silicone composition of the invention, as with ordinary conventional silicone compositions, can be suitably used in a broad range of applications, and is especially effective in applications requiring good shelf stability and heat resistance. When the silicone composition of the invention is to be heat-cured, the curing conditions, although not particularly limited, are typically a temperature of from 80 to 200° C., preferably from 90 to 180° C., and more preferably from 100 to 170° C., and a period of from 10 minutes to 24 hours, preferably from 30 minutes to 12 hours, and even more preferably from 1 to 6 hours.

EXAMPLES

The invention is illustrated more fully below by way of Synthesis Examples, Working Examples and Comparative Examples, although these Examples are not intended to limit the invention. The instruments mentioned below were used to measure the viscosities and average molecular weights of the compounds obtained in the Synthesis Examples and the Working Examples, and to carry out structural analyses.

[Viscosity]

The viscosity was measured at 25° C. using a TVB10 viscometer from Toki Sangyo Co., Ltd.

[Average Molecular Weight]

Measured using an HLC-8220 GPC, a high-speed GPC system from Tosoh Corporation (eluting solvent: toluene; flow rate: 0.3 mL/min; column oven temperature: 40° C.; columns: TSKgel superH2000, TSKgel superH3000, TSKgel superH4000, TSKgel superH5000; detector: RI).

[Structural Analysis]

Structural analysis of the compounds was carried out using an AVANCE III HD NanoBay 400 MHz NMR device from Bruker Corporation and a Spectrum One Fourier transform IR spectrometer from PerkinElmer.

Synthesis Example 1

Preparation of 1,1,3,3-Tetramethyl-1,3-Bis[2-(Trimethylsilyl)-Ethenyl]-(E,E)-Disiloxane First, 1,1,3,3-tetramethyl-1,3-bis[2-(trimethylsilyl)-ethenyl]-(E,E)-disiloxane of formula (6) below was prepared as an end-group precursor for the terminal vinylene group-containing organopolysiloxane compound of the invention.

[Chemical Formula 61]

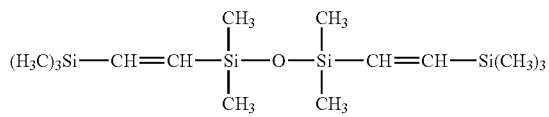

(6)

Figure 2:
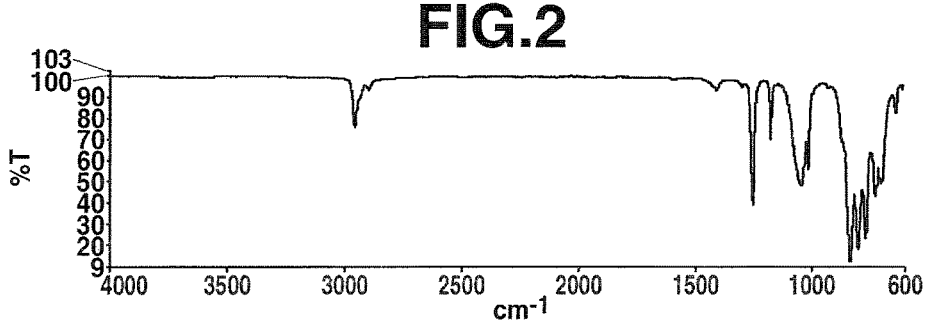
FIG. 2 is an FT-IR spectrum of the 1,1,3,3-tetramethyl-1,3-bis[2-(trimethylsilyl)ethenyl]-(E,E)-disiloxane obtained in Synthesis Example 1 of the invention.

A 500 mL four-neck flask equipped with a stirrer, a reflux condenser, a thermometer and a dropping funnel was charged with 61.4 g (0.62 mol) of ethynyltrimethylsilane and 0.1 g of a 50 wt % toluene solution of platinum-divinyltetramethyldisiloxane complex, and the temperature was raised to 75° C. under stirring. Next, 34.2 g (0.25 mol) of 1,1,3,3-tetramethyldisiloxane was added dropwise under stirring, whereupon the reaction temperature rose to between 80 and 85° C. The reaction system was held under these conditions for 5 hours, after which vacuum distillation was carried out, giving 55.3 g (yield, 67%) of the target 1,1,3,3-tetramethyl-1,3-bis[2-(trimethylsilyl)-ethenyl]-(E,E)-disiloxane as a clear, colorless fraction. The $^1$H-NMR spectrum and FT-IR spectrum of the resulting 1,1,3,3-tetramethyl-1, 3-bis[2-(trimethylsilyl)ethenyl]-(E,E)-disiloxane are shown respectively in FIGS. 1 and 2.

Synthesis Example 2

Preparation of Branched End-Group Precursor (1)

The compound of formula (48) below was prepared as a branched end-group precursor for the terminal vinylene group-containing organopolysiloxane compound of the invention.

[Chemical Formula 62]

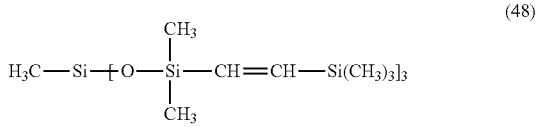

(48)

A 500 mL four-neck flask equipped with a stirrer, a reflux condenser, a thermometer and a dropping funnel was charged with 33.0 g (100 mmol) of the 1,1,3,3-tetramethyl-1,3-bis[2-(trimethylsilyl)ethenyl]-(E,E)-disiloxane of formula (6), 4.5 g (33.1 mmol) of methyltrimethoxysilane and 2.1 g of methanol, and the flask contents were cooled to 10° C. or below under stirring. Next, 0.65 g (6.63 mmol) of concentrated sulfuric acid was added dropwise under stirring while keeping the system interior at 10° C. or below. In addition, a mixed solution of 1.1 g (61.1 mmol) of water and 1.1 g of methanol was added dropwise while keeping the system interior at 10° C. or below. After raising the temperature of the system to 25° C., the reaction system was held under the same conditions for one hour, then 2.4 g (133 mmol) of water was added dropwise while keeping the system interior at 25° C. or below, following which the reaction system was held at this temperature for 3 hours. Spent acid separation was subsequently carried out, following which the system was rinsed and washed with water to neutrality. Vacuum distillation was then carried out, giving 11.2 g (yield, 60%) of the target branched end-group precursor of formula (48) above as a clear, colorless fraction.

Synthesis Example 3

Preparation of Branched End-Group Precursor (2)

The compound of formula (50) below was prepared as a branched end-group precursor for the terminal vinylene group-containing organopolysiloxane compound of the invention.

[Chemical Formula 63]

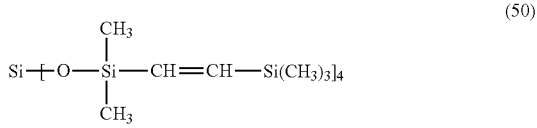

(50)

A 500 mL four-neck flask equipped with a stirrer, a reflux condenser, a thermometer and a dropping funnel was charged with 33.0 g (100 mmol) of the 1,1,3,3-tetramethyl-1,3-bis[2-(trimethylsilyl)ethenyl]-(E,E)-disiloxane of formula (6), 3.8 g (25.0 mmol) of tetramethoxysilane and 2.1 g of methanol, and the flask contents were cooled to 10° C. or below under stirring. Next, 0.65 g (6.63 mmol) of concentrated sulfuric acid was added dropwise under stirring while keeping the system interior at 10° C. or below. In addition, a mixed solution of 1.1 g (61.1 mmol) of water and 1.1 g of methanol was added dropwise while keeping the system interior at 10° C. or below. After raising the temperature of the system to 25° C., the reaction system was held under the same conditions for one hour, then 2.4 g (133 mmol) of water was added dropwise while keeping the system interior at 25° C. or below, following which the reaction system was held at this temperature for 3 hours. Spent acid separation was subsequently carried out, following which the system was rinsed and washed with water to neutrality. Vacuum distillation was then carried out, giving 8.6 g (yield, 48%) of the target branched end-group precursor of formula (50) above as a clear, colorless fraction.

Working Example 1

Preparation of Terminal Vinylene Group-Containing Organopolysiloxane Compound 1

A 300 mL four-neck flask equipped with a stirrer and a thermometer was charged with 50 g (169 mmol) of octamethylcyclotetrasiloxane, 7.2 g (27 mmol) of 1,1,3,3-tetramethyl-1,3-bis[2-(trimethylsilyl)ethenyl]-(E,E)-disiloxane and, as potassium hydroxide, 0.12 g of 3 wt % potassium siliconate, and the flask contents were stirred for 8 hours at 150° C. The system was allowed to cool to room temperature, after which the system was neutralized by adding 0.03 g (0.4 mmol) of ethylene chlorohydrin and stirring for 2 hours at 150° C. Stripping under reduced pressure at 150° C. and 8 mmHg followed by pressure filtration were then carried out, giving a clear, colorless polymer of formula (36) below (viscosity: 30 mPa·s).

[Chemical Formula 64]

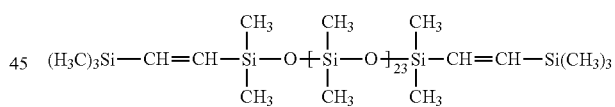

(36)

Working Example 2

Preparation of Terminal Vinylene Group-Containing Organopolysiloxane Compound 2

A 500 mL four-neck flask equipped with a stirrer and a thermometer was charged with 295 g (997 mmol) of octamethylcyclotetrasiloxane, 7.7 g (29 mmol) of 1,1,3,3-tetramethyl-1,3-bis[2-(trimethylsilyl)ethenyl]-(E,E)-disiloxane and, as potassium hydroxide, 0.64 g of 3 wt % potassium siliconate, and the flask contents were stirred for 8 hours at 150° C. The system was allowed to cool to room temperature, after which the system was neutralized by adding 0.14 g (1.7 mmol) of ethylene chlorohydrin and stirring for 2 hours at 150° C. Stripping under reduced pressure at 150° C. and 8 mmHg followed by pressure filtration were then carried out, giving a clear, colorless polymer of formula (37) below (viscosity: 930 mPa·s).

[Chemical Formula 65]

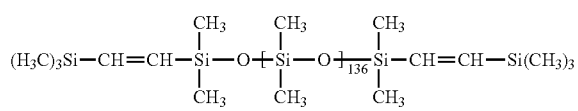
(37)

Working Example 3

Preparation of Terminal Vinylene Group-Containing Organopolysiloxane Compound 3

A 500 mL four-neck flask equipped with a stirrer and a thermometer was charged with 295 g (997 mmol) of octamethylcyclotetrasiloxane, 2.2 g (8.3 mmol) of 1,1,3,3-tetramethyl-1,3-bis[2-(trimethylsilyl)ethenyl]-(E,E)-disiloxane and, as potassium hydroxide, 0.64 g of 3 wt % potassium siliconate, and the flask contents were stirred for 8 hours at 150° C. The system was allowed to cool to room temperature, after which the system was neutralized by adding 0.14 g (1.7 mmol) of ethylene chlorohydrin and stirring for 2 hours at 150° C. Stripping under reduced pressure at 150° C. and 8 mmHg followed by pressure filtration were then carried out, giving a clear, colorless polymer of formula (38) below (viscosity: 6,700 mPa·s).

[Chemical Formula 66]

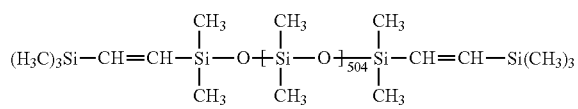
(38)

Working Example 4

Preparation of Terminal Vinylene Group-Containing Organopolysiloxane Compound 4

A 1-liter four-neck flask equipped with a stirrer and a thermometer was charged with 614 g (2,074 mmol) of octamethylcyclotetrasiloxane, 2.2 g (8.3 mmol) of 1,1,3,3-tetramethyl-1,3-bis[2-(trimethylsilyl)ethenyl]-(E,E)-disiloxane and, as potassium hydroxide, 1.31 g of 3 wt % potassium siliconate, and the flask contents were stirred for 8 hours at 150° C. The system was allowed to cool to room temperature, after which the system was neutralized by adding 0.29 g (3.6 mmol) of ethylene chlorohydrin and stirring for 2 hours at 150° C. Stripping under reduced pressure at 150° C. and 8 mmHg followed by pressure filtration were then carried out, giving a clear, colorless polymer of formula (39) below (viscosity: 76,200 mPa·s).

[Chemical Formula 67]

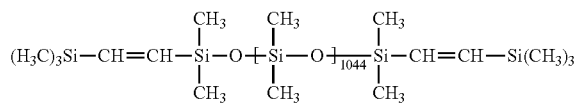
(39)

Working Example 5

Preparation of Terminal Vinylene Group-Containing Organopolysiloxane Compound 5

A 2-liter four-neck flask equipped with a stirrer and a thermometer was charged with 1,166 g (3,939 mmol) of octamethylcyclotetrasiloxane, 2.2 g (8.3 mmol) of 1,1,3,3-tetramethyl-1,3-bis[2-(trimethylsilyl)ethenyl]-(E,E)-disiloxane and, as potassium hydroxide, 2.49 g of 3 wt % potassium siliconate, and the flask contents were stirred for 8 hours at 150° C. The system was allowed to cool to room temperature, after which the system was neutralized by adding 0.55 g (6.8 mmol) of ethylene chlorohydrin and stirring for 2 hours at 150° C. Stripping under reduced pressure at 150° C. and 8 mmHg followed by pressure filtration were then carried out, giving a clear, colorless polymer of formula (40) below (viscosity: 980,500 mPa·s).

[Chemical Formula 68]

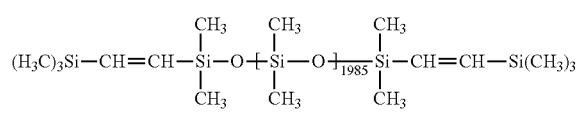
(40)

Working Example 6

Preparation of Terminal Vinylene Group-Containing Organopolysiloxane Compound 6

A 300 mL four-neck flask equipped with a stirrer and a thermometer was charged with 50 g (169 mmol) of octamethylcyclotetrasiloxane, 7.2 g (27 mmol) of 1,1,3,3-tetramethyl-1,3-bis[2-(trimethylsilyl)ethenyl]-(E,E)-disiloxane and 1.7 g of concentrated sulfuric acid, and the flask contents were stirred for 3 hours at room temperature. Next, 0.9 g of water was added and the system was stirred for 1 hour, then 30 mL of toluene was added and spent acid separation was carried out, following which the system was rinsed and washed with water to neutrality. Stripping under reduced pressure at 150° C. and 8 mmHg followed by pressure filtration were then carried out, giving a clear, colorless polymer of formula (41) below (viscosity: 42 mPa·s).

[Chemical Formula 69]

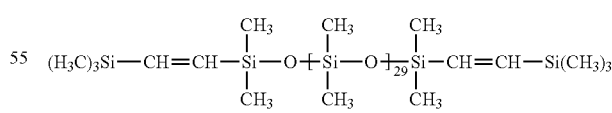
(41)

Working Example 7

Preparation of Terminal Vinylene Group-Containing Organopolysiloxane Compound 7

A 500 mL four-neck flask equipped with a stirrer and a thermometer was charged with 295 g (997 mmol) of octamethylcyclotetrasiloxane, 7.7 g (29 mmol) of 1,1,3,3-tetramethyl-1,3-bis[2-(trimethylsilyl)ethenyl]-(E,E)-disiloxane and 9.1 g of concentrated sulfuric acid, and the flask contents were stirred for 3 hours at room temperature. Next, 3.6 g of water was added and the system was stirred for 1 hour, then 150 mL of toluene was added and spent acid separation was carried out, following which the system was rinsed and washed with water to neutrality. Stripping under reduced pressure at 150° C. and 8 mmHg followed by pressure filtration were then carried out, giving a clear, colorless polymer of formula (42) below (viscosity: 916 mPa·s).

[Chemical Formula 70]

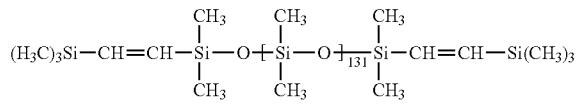

(42)

Working Example 8

Preparation of Terminal Vinylene Group-Containing Organopolysiloxane Compound 8

A 500 mL four-neck flask equipped with a stirrer and a thermometer was charged with 295 g (997 mmol) of octamethylcyclotetrasiloxane, 2.2 g (8.3 mmol) of 1,1,3,3-tetramethyl-1,3-bis[2-(trimethylsilyl)ethenyl]-(E,E)-disiloxane and 9.1 g of concentrated sulfuric acid, and the flask contents were stirred for 3 hours at room temperature. Next, 3.6 g of water was added and the system was stirred for 1 hour, then 150 mL of toluene was added and spent acid separation was carried out, following which the system was rinsed and washed with water to neutrality. Stripping under reduced pressure at 150° C. and 8 mmHg followed by pressure filtration were then carried out, giving a clear, colorless polymer of formula (43) below (viscosity: 7,180 mPa·s).

[Chemical Formula 71]

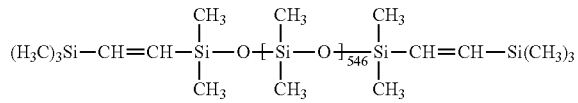

(43)

Working Example 9

Preparation of Terminal Vinylene Group-Containing Organopolysiloxane Compound 9

A 1-liter four-neck flask equipped with a stirrer and a thermometer was charged with 614 g (2,074 mmol) of octamethylcyclotetrasiloxane, 2.2 g (8.3 mmol) of 1,1,3,3-tetramethyl-1,3-bis[2-(trimethylsilyl)ethenyl]-(E,E)-disiloxane and 18.5 g of concentrated sulfuric acid, and the flask contents were stirred for 3 hours at room temperature. Next, 7.4 g of water was added and the system was stirred for 1 hour, then 300 mL of toluene was added and spent acid separation was carried out, following which the system was rinsed and washed with water to neutrality. Stripping under reduced pressure at 150° C. and 8 mmHg followed by pressure filtration were then carried out, giving a clear, colorless polymer of formula (44) below (viscosity: 74,300 mPa·s).

[Chemical Formula 72]

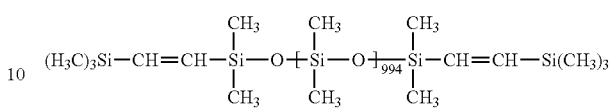

(44)

Working Example 10

Preparation of Terminal Vinylene Group-Containing Organopolysiloxane Compound 10

A 2-liter four-neck flask equipped with a stirrer and a thermometer was charged with 1,166 g (3,939 mmol) of octamethylcyclotetrasiloxane, 2.2 g (8.3 mmol) of 1,1,3,3-tetramethyl-1,3-bis[2-(trimethylsilyl)ethenyl]-(E,E)-disiloxane and 35.0 g of concentrated sulfuric acid, and the flask contents were stirred for 3 hours at room temperature. Next, 14.0 g of water was added and the system was stirred for 1 hour, then 600 mL of toluene was added and spent acid separation was carried out, following which the system was rinsed and washed with water to neutrality. Stripping under reduced pressure at 150° C. and 8 mmHg followed by pressure filtration were then carried out, giving a clear, colorless polymer of formula (45) below (viscosity: 966,200 mPa·s).

[Chemical Formula 73]

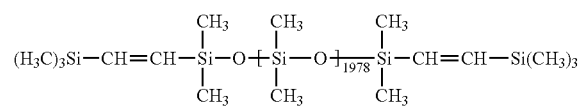

(45)

Working Example 11

Preparation of Terminal Vinylene Group-Containing Organopolysiloxane Compound 11

A 1-liter four-neck flask equipped with a stirrer and a thermometer was charged with 407 g (997 mmol) of octaethylcyclotetrasiloxane, 7.7 g (29 mmol) of 1,1,3,3-tetramethyl-1,3-bis[2-(trimethylsilyl)ethenyl]-(E,E)-disiloxane and 12.5 g of concentrated sulfuric acid, and the flask contents were stirred for 3 hours at room temperature. Next, 5.0 g of water was added and the system was stirred for 1 hour, then 300 mL of toluene was added and spent acid separation was carried out, following which the system was rinsed and washed with water to neutrality. Stripping under reduced pressure at 150° C. and 8 mmHg followed by pressure filtration were then carried out, giving a clear, colorless polymer of formula (46) below (viscosity: 2,280 mPa·s).

[Chemical Formula 74]

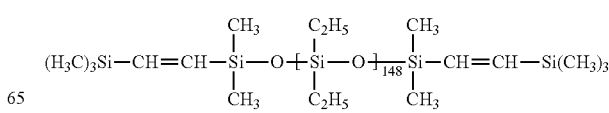

(46)

Working Example 12

Preparation of Terminal Vinylene Group-Containing Organopolysiloxane Compound 12

A 500 mL four-neck flask equipped with a stirrer and a thermometer was charged with 92 g (169 mmol) of 1,3,5,7-tetramethyl-1,3,5,7-tetraphenylcyclotetrasiloxane, 7.2 g (27 mmol) of 1,1,3,3-tetramethyl-1,3-bis[2-(trimethyl-silyl) ethenyl]-(E,E)-disiloxane and 3.0 g of concentrated sulfuric acid, and the flask contents were stirred for 3 hours at room temperature. Next, 1.2 g of water was added and the system was stirred for 1 hour, then 100 mL of toluene was added and spent acid separation was carried out, following which the system was rinsed and washed with water to neutrality. Stripping under reduced pressure at 150° C. and 8 mmHg followed by pressure filtration were then carried out, giving a clear, colorless polymer of formula (47) below (viscosity: 2,500 mPa·s).

Working Example 13

Preparation of Terminal Vinylene Group-Containing Organopolysiloxane Compound 13

A 500-mL four-neck flask equipped with a stirrer and a thermometer was charged with 295 g (997 mmol) of octamethylcyclotetrasiloxane, 6.8 g (12 mmol) of the siloxane compound of formula (48) below and 9.1 g of concentrated sulfuric acid, and the flask contents were stirred for 3 hours at room temperature. Next, 3.6 g of water was added and the system was stirred for 1 hour, then 300 mL of toluene was added and spent acid separation was carried out, following which the system was rinsed and washed with water to neutrality. Stripping under reduced pressure at 150° C. and 8 mmHg followed by pressure filtration were then carried out, giving a clear, colorless polymer of formula (49) below (viscosity: 4,420 mPa·s).

[Chemical Formula 76]

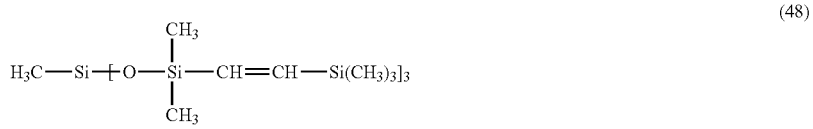
(48)

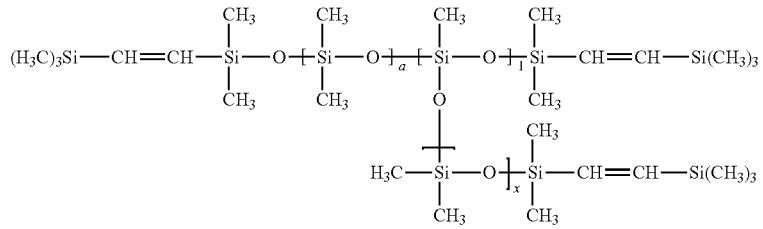
(49)

$a + x = 322$

Working Example 14

Preparation of Terminal Vinylene Group-Containing Organopolysiloxane Compound 14

A 500-mL four-neck flask equipped with a stirrer and a thermometer was charged with 295 g (997 mmol) of octamethylcyclotetrasiloxane, 8.3 g (12 mmol) of the siloxane compound of formula (50) below and 9.1 g of concentrated sulfuric acid, and the flask contents were stirred for 3 hours at room temperature. Next, 3.6 g of water was added and the system was stirred for 1 hour, then 300 mL of toluene was added and spent acid separation was carried out, following which the system was rinsed and washed with water to neutrality. Stripping under reduced pressure at 150° C. and 8 mmHg followed by pressure filtration were then carried out, giving a clear, colorless polymer of formula (51) below (viscosity: 4,100 mPa·s).

[Chemical Formula 75]

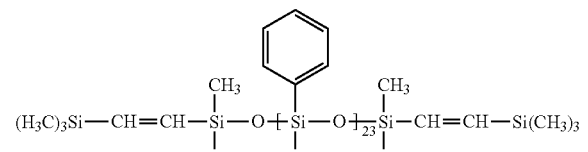
(47)

[Chemical Formula 77]

(50)

-continued

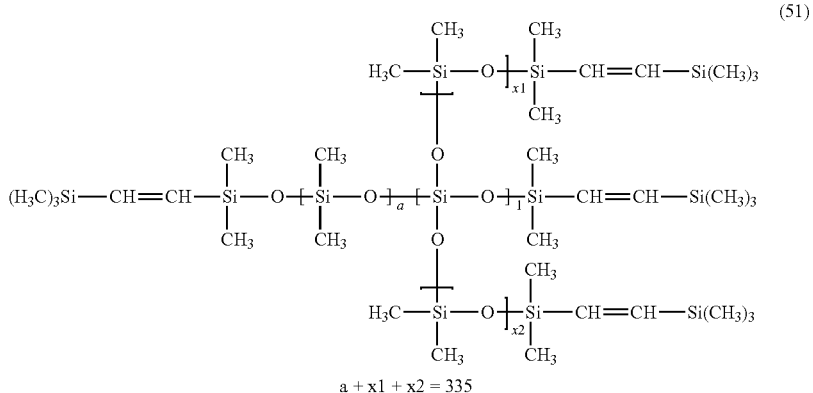

(51)

a + x1 + x2 = 335

Figure 3:
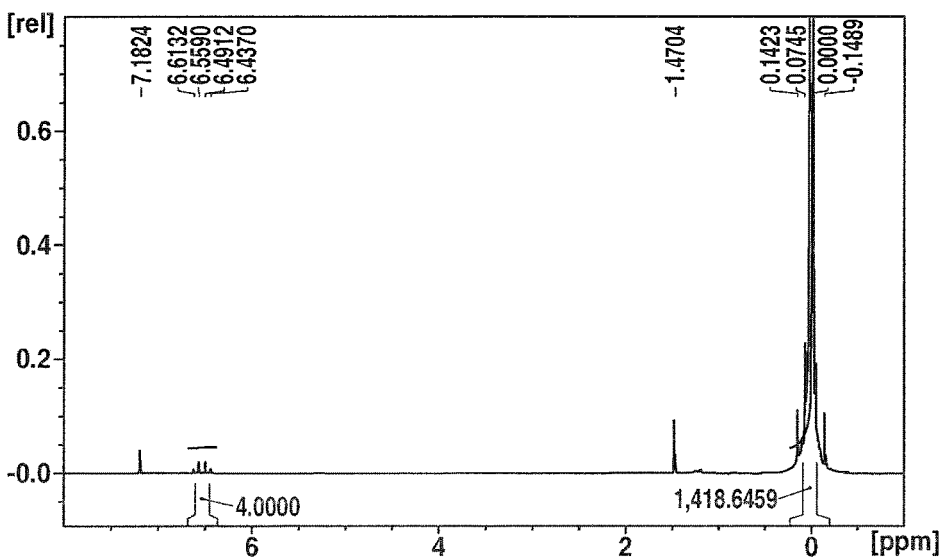
FIG. 3 is an $^1$H-NMR spectrum of the terminal vinylene group-containing organopolysiloxane compound obtained in Working Example 2 of the invention.
Figure 4:
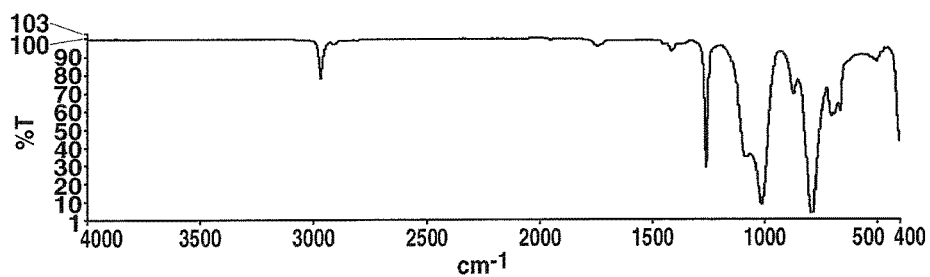
FIG. 4 is an FT-IR spectrum of the terminal vinylene group-containing organopolysiloxane compound obtained in Working Example 2 of the invention.
Figure 5:
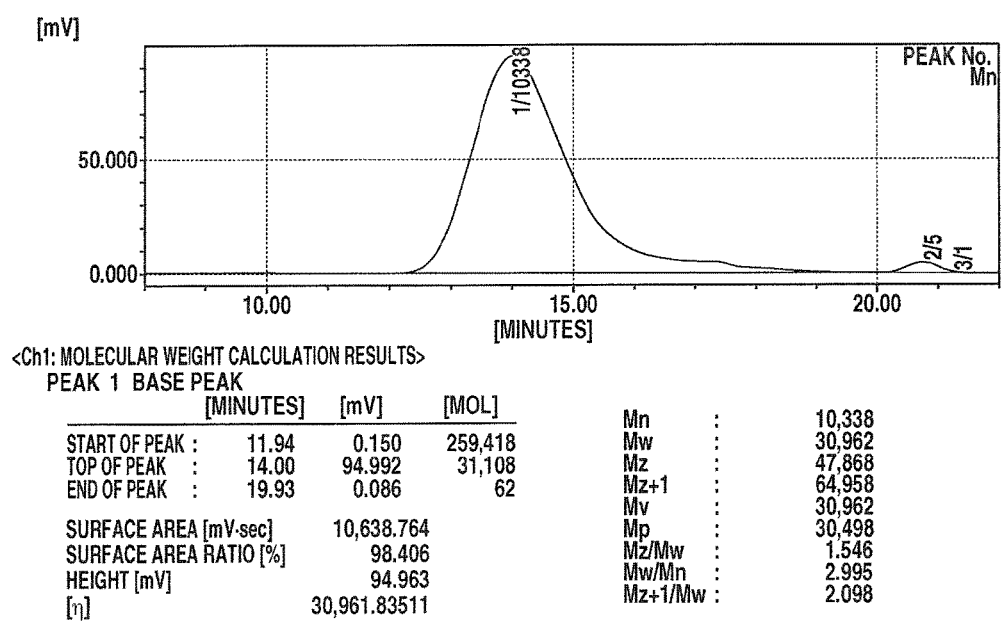
FIG. 5 is a GPC curve of the terminal vinylene group-containing organopolysiloxane compound obtained in Working Example 2 of the invention.

FIGS. 3 to 5 show, respectively, an ¹H-NMR spectrum, a FT-IR spectrum and a GPC curve for, as a representative example, the terminal vinylene group-containing methylpolysiloxane compound obtained in Working Example 2.

Next, Working Examples of addition-curable silicone compositions according to the invention and Comparative Examples are described.

First, the following ingredients were provided.

Component (A)

A-1:

A 500-mL four-neck flask equipped with a stirrer and a thermometer was charged with 295 g (997 mmol) of octamethylcyclotetrasiloxane, 5.5 g (17 mmol) of 1,1,3,3-tetramethyl-1,3-bis[2-(trimethylsilyl)ethenyl]-(E,E)-disiloxane and 9.0 g of concentrated sulfuric acid, and the flask contents were stirred for 3 hours at room temperature. Next, 3.0 g of water was added and the system was stirred for 30 minutes, then 150 mL of toluene was added and spent acid separation was carried out, following which the system was rinsed and washed with water to neutrality. Stripping under reduced pressure at 150° C. and 8 mmHg followed by pressure filtration were then carried out, giving a clear, colorless polymer of formula (12) below (viscosity at 25° C.: 924 mPa·s).

[Chemical Formula 78]

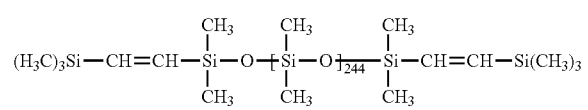

(12)

A-2:

A 1-liter four-neck flask equipped with a stirrer and a thermometer was charged with 407 g (997 mmol) of octaethylcyclotetrasiloxane, 5.5 g (17 mmol) of 1,1,3,3-tetramethyl-1,3-bis[2-(trimethylsilyl)ethenyl]-(E,E)-disiloxane and 9.0 g of concentrated sulfuric acid, and the flask contents were stirred for 3 hours at room temperature. Next, 3.0 g of water was added and the system was stirred for 30 minutes, then 150 mL of toluene was added and spent acid separation was carried out, following which the system was rinsed and washed with water to neutrality. Stripping under reduced pressure at 150° C. and 8 mmHg followed by pressure filtration were then carried out, giving a clear, colorless polymer of formula (13) below (viscosity at 25° C.: 1,330 mPa·s).

[Chemical Formula 79]

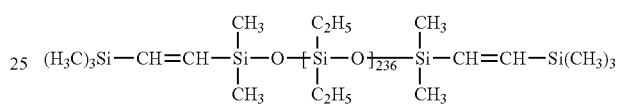

(13)

A-3:

A dimethylpolysiloxane capped at both ends with dimethylvinylsilyl groups and having a viscosity at 25° C. of 1,000 mPa·s.

Component (B)

B-1:

[Chemical Formula 80]

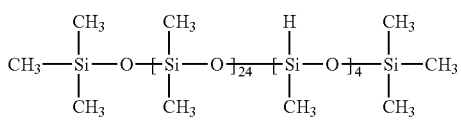

(14)

B-2:

[Chemical Formula 81]

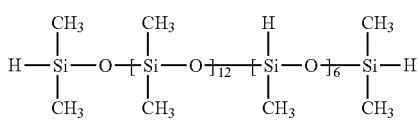

(15)

Component (C)

C-1:

A solution of platinum-divinyltetramethyldisiloxane complex dissolved in the same dimethylpolysiloxane as A-3 above (platinum content: 1 wt %, platinum atom basis)

Component (D)

D-1:

[Chemical Formula 82]

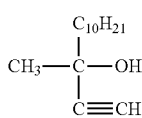

(16)

Component (E)
E-1: Aluminum powder with average particle size of 10.0 µm
E-2: Zinc oxide powder with average particle size of 1.0 µm
E-3: Hydrophobic fumed silica powder with average particle size of 30 nm Component (F)
F-1:

[Chemical Formula 83]

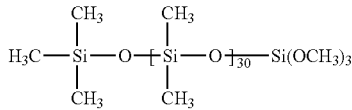 (17)

Component (G)
G-1:

[Chemical Formula 84]

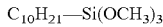 (18)

Components (A) to (F) were mixed as follows to give the compositions of Working Examples 15 to 20 and Comparative Examples 1 to 6.

That is, a THINKY MIXER (manufactured by Thinky KK) was loaded with component (A) in the amounts indicated in Tables 1 and, where necessary, components (E), (F) and (G), and the contents of the mixer were mixed to uniformity. Components (D), (C) and (B) were then added and the mixer contents were mixed to uniformity.

The ratio of the number of SiH groups in component (B) to the number of aliphatic unsaturated hydrocarbon groups in component (A) for the resulting compositions in Working Examples 15 to 20 and Comparative Examples 1 to 6, and the results obtained in the shelf stability and heat resistance tests described below on these compositions are presented together in Tables 1 and 2.

[Shelf Stability Test]

The silicone composition was placed in a 40° C. dryer, and the number of days until the composition cured was determined.

[Heat Resistance Test]

The silicone composition was heated from 30° C. to 600° C. in air at a temperature rise rate of 10° C./min, and the percent weight loss was measured. In compositions to which ingredients such as inorganic fillers that are stable within this temperature range were added, the percent weight loss was calculated only for the other ingredients. A thermogravimetric/differential thermal analyzer (TG/DTA 7200, from SII NanoTechnology Inc.) was used for measurement.

TABLE 1

| Composition (pbw) | Working Example | | | | | |
|---|---|---|---|---|---|---|
| | 15 | 16 | 17 | 18 | 19 | 20 |
| A-1 | 100 | 100 | 100 | | 100 | 100 |
| A-2 | | | | 100 | | |
| A-3 | | | | | | |
| B-1 | 9.5 | | | 6.3 | 9.5 | 9.5 |
| B-2 | | 1.0 | 10 | | | |
| C-1 | 0.2 | 0.2 | 0.2 | 0.2 | 0.2 | 0.2 |
| D-1 | 0.4 | 0.4 | 0.4 | 0.4 | 0.4 | 0.4 |
| E-1 | | | | | 600 | |
| E-2 | | | | | | 150 |

TABLE 1-continued

| Composition (pbw) | Working Example | | | | | |
|---|---|---|---|---|---|---|
| | 15 | 16 | 17 | 18 | 19 | 20 |
| E-3 | | | | | | 7 |
| F-1 | | | | | 10 | |
| G-1 | | | | | 5 | |
| Number of SiH groups in component (B)/ number of aliphatic unsaturated hydrocarbon groups in component (A) (ratio of number) | 1.5 | 0.5 | 5.0 | 1.5 | 1.5 | 1.5 |
| Results of shelf stability tests (number of days until composition cures) | 22 | 35 | 20 | 24 | 26 | 22 |
| Results of heat resistance tests (percent weight loss on heating from 30° C. to 600° C.) | 45 | 48 | 44 | 43 | 48 | 45 |

TABLE 2

| Composition (pbw) | Comparative Example | | | | | |
|---|---|---|---|---|---|---|
| | 1 | 2 | 3 | 4 | 5 | 6 |
| A-1 | | | 100 | 100 | 100 | 100 |
| A-2 | | | | | | |
| A-3 | 100 | 100 | | | | |
| B-1 | 9.5 | 12.7 | | 2.3 | | 32 |
| B-2 | | | 0.8 | | 11 | |
| C-1 | 0.2 | 0.2 | 0.2 | 0.2 | 0.2 | 0.2 |
| D-1 | 0.4 | 0.4 | 0.4 | 0.4 | 0.4 | 0.4 |
| E-1 | | | | | | |
| E-2 | | | | | | |
| E-3 | | | | | | |
| F-1 | | | | | | |
| G-1 | | | | | | |
| Number of SiH groups in component (B)/ number of aliphatic unsaturated hydrocarbon groups in component (A) (ratio of number) | 1.5 | 2.0 | 0.4 | 0.4 | 5.5 | 5.5 |
| Results of shelf stability tests (number of days until composition cures) | 14 | 10 | did not cure | did not cure | 11 | 12 |
| Results of heat resistance tests (percent weight loss on heating from 30° C. to 600° C.) | 56 | 57 | | | 47 | 49 |

The results in Tables 1 and 2 show that, compared with Comparative Examples 1 to 6, Working Examples 15 to 20 which satisfy the necessary conditions of the invention exhibit, based on the shelf stability test results, a longer number of days until the composition cures and also exhibit, based on the heat resistance test results, a lower percent weight loss when heated from 30° C. to 600° C. It was thus possible to confirm that the silicone compositions of the invention have an excellent shelf stability and an excellent heat resistance.

That is, the addition-curable silicone composition of the invention are endowed with both excellent shelf stability and excellent heat resistance.

The invention is not limited to the embodiments described above, which are presented here for the purpose of illustration. Any embodiment which has substantially the same constitution as the technical ideas set forth in the claims and which exhibits similar actions and effects is encompassed by the technical scope of the invention.

The invention claimed is:

1. A terminal vinylene group-containing organopolysiloxane compound of general formula (2) below

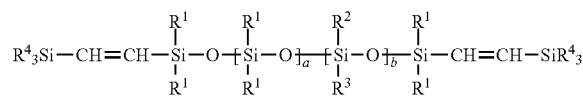
(2)

wherein:
R$^1$ is a hydrogen atom or a monovalent hydrocarbon group of 1 to 20 carbon atoms which may have a substituent, each R$^1$ being the same or different;
R$^2$ is a hydrogen atom, a monovalent hydrocarbon group of 1 to 20 carbon atoms which may have a substituent, or a group of general formula (a) below

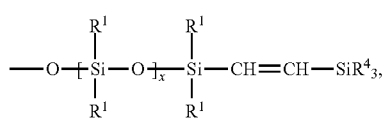
(a)

each R$^2$ being the same or different;
the letter x is an integer from 0 to 1,998;
R$^3$ is a group of above formula (a), each R$^3$ being the same or different;
R$^4$ is a monovalent hydrocarbon group of 1 to 20 carbon atoms which may have a substituent, each R$^4$ being the same or different and being selected from linear, branched, or cyclic alkyl groups, halogen-substituted alkyl groups, alkenyl groups, 2-propynyl, aryl groups, aralkyl groups, and halogen-substituted aryl groups;
the letter a is an integer from 1 to 2,000; the letter b is an integer from 0 to 1,999; and
the sum of a, b and x is an integer from 1 to 2,000.

2. The organopolysiloxane compound of claim 1, wherein R$^4$ is methyl, ethyl, propyl, butyl, pentyl, hexyl, heptyl, octyl, isopropyl, isobutyl, tertiary-butyl, isopentyl, neopentyl, cyclopentyl, cyclohexyl, cycloheptyl, chloromethyl, 3-chloropropyl, 3,3,3-trifluoropropyl, bromopropyl, ethenyl, 1-methylethenyl, 2-propenyl, 2-propynyl, phenyl, tolyl, benzyl, 2-phenylethyl, α,α,α-trifluorotolyl, or chlorobenzyl.

3. A method for preparing a terminal vinylene group-containing organopolysiloxane compound of general formula (2) below

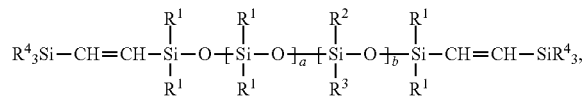
(2)

the method being characterized by carrying out, in the presence of an acidic or basic catalyst, an equilibration reaction between a compound of general formula (3) below

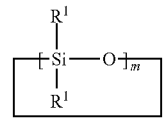
(3)

and a compound of general formula (4) below

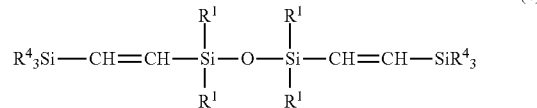
(4)

or a compound of general formula (5) below $$R^{20}_{4-y}\text{—Si—}R^{30}_{y} \quad (5)$$

where, in the above formulas,
R$^1$ is a hydrogen atom or a monovalent hydrocarbon group of 1 to 20 carbon atoms which may have a substituent, each R$^1$ being the same or different;
R$^2$ is a hydrogen atom, a monovalent hydrocarbon group of 1 to 20 carbon atoms which may have a substituent, or a group of general formula (a) below

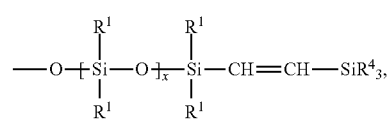
(a)

each R$^2$ being the same or different; the letter x is an integer from 0 to 1,998;
R$^3$ is a group of formula (a), each R$^3$ being the same or different;
R$^4$ is a monovalent hydrocarbon group of 1 to 20 carbon atoms which may have a substituent, each R$^4$ being the same or different and being selected from linear, branched, or cyclic alkyl groups, halogen-substituted alkyl groups, alkenyl groups, 2-propynyl, aryl groups, aralkyl groups, and halogen-substituted aryl groups;
the letter a is an integer from 1 to 2,000, the letter b is an integer from 0 to 1,999, and the sum of a, b and x is an integer from 1 to 2,000;
R$^{20}$ is a hydrogen atom, a monovalent hydrocarbon group of 1 to 20 carbon atoms which may have a substituent, or a group of general formula (a0) below

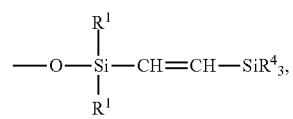
(a0)

each R$^{20}$ being the same or different;
R$^{30}$ is a group of formula (a0) above, each R$^{30}$ being the same or different;

the letter m is an integer from 3 to 20; and
the letter y is 3 or 4.

4. The method of preparing a compound according to claim 3, wherein $R^4$ is methyl, ethyl, propyl, butyl, pentyl, hexyl, heptyl, octyl, isopropyl, isobutyl, tertiary-butyl, isopentyl, neopentyl, cyclopentyl, cyclohexyl, cycloheptyl, chloromethyl, 3-chloropropyl, 3,3,3-trifluoropropyl, bromopropyl, ethenyl, 1-methylethenyl, 2-propenyl, 2-propynyl, phenyl, tolyl, benzyl, 2-phenylethyl, α,α,α-trifluorotolyl, or chlorobenzyl.

5. An addition-curable silicone composition characterized by comprising, as essential ingredients:
(A) 100 parts by weight of a terminal vinylene group-containing organopolysiloxane compound of general formula (2A) below

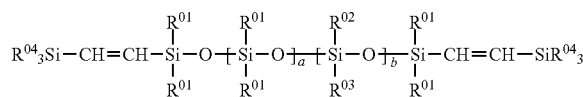

(2A)

wherein
$R^{01}$ is a monovalent hydrocarbon group of 1 to 20 carbon atoms which may have a substituent, each $R^{01}$ being the same or different;
$R^{02}$ is a monovalent hydrocarbon group of 1 to 20 carbon atoms which may have a substituent, or a group of general formula (a') below

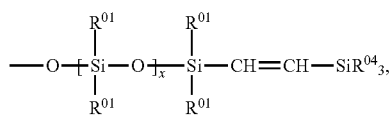

(a')

each $R^{02}$ being the same or different;
the letter x is an integer from 0 to 1,998;
$R^{03}$ is a group of above formula (a'), each $R^{03}$ being the same or different;
$R^{04}$ is a monovalent hydrocarbon group of 1 to 20 carbon atoms which may have a substituent, each $R^{04}$ being the same or different and being selected from linear, branched, or cyclic alkyl groups, halogen-substituted alkyl groups, alkenyl groups, 2-propynyl, aryl groups, aralkyl groups, and halogen-substituted aryl groups;
the letter a is an integer from 1 to 2,000;
the letter b is an integer from 0 to 1,999; and
the sum of a, b and x is an integer from 1 to 2,000;
(B) an organohydrogenpolysiloxane compound having two or more silicon atom-bonded hydrogen atoms (SiH groups) per molecule, in an amount such that the number of SiH groups in component (B) relative to the sum of the number of aliphatic unsaturated hydrocarbon groups in component (A) is from 0.5 to 5; and
(C) an effective amount of a hythosilylation catalyst.

6. The addition-curable silicone composition of claim 5 which is characterized by including:
(D) an effective amount of one or more regulator selected from the group consisting of acetylene compounds, nitrogen compounds, organophosphorus compounds, oxime compounds and organochlorine compounds.

7. The addition-curable silicone composition of claim 6, wherein:
(A) is a compound of the formula

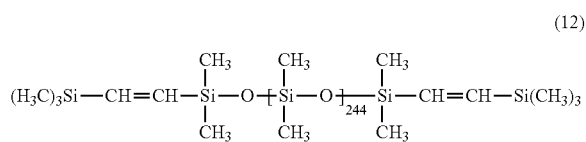

(12)

or a compound of the formula

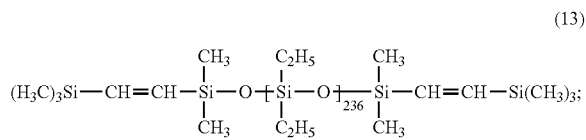

(13)

(B) is a compound of the formula

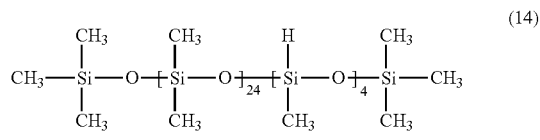

(14)

or a compound of the formula

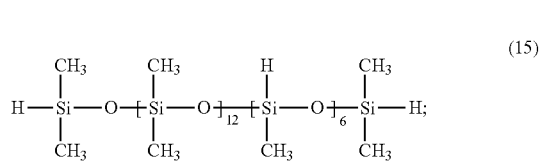

(15)

(C) is a solution of platinum-divinyltetramethyldisiloxane complex; and
(D) is a compound of the formula

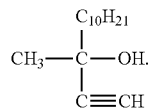

(16)

8. The addition-curable silicone composition of claim 5 or 6 which is characterized by including:
(E) from 1 to 2,000 parts by weight of at least one inorganic filler selected from the group consisting of metals, metal oxides, metal hydroxides, metal nitrides, metal carbonates and carbon allotropes per 100 parts by weight of component (A).

9. The addition-curable silicone composition of claim 5 or claim 6, which is characterized by including either or both of:
(F) from 1 to 200 parts by weight, per 100 parts by weight of component (A), of a hydrolyzable organopolysiloxane compound of general formula (i) below

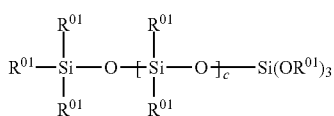

wherein $R^{01}$ is a monovalent hydrocarbon group of 1 to 20 carbon atoms which may have a substituent, each $R^{01}$ being the same or different; and the letter c is an integer from 5 to 100, and (G) from 0.01 to 10 parts by weight, per 100 parts by weight of component (A), of a hydrolyzable organosilane compound of general formula (ii) below $$R^{05}\text{—Si(OR}^{01})_3 \qquad \text{(ii)}$$

wherein $R^{01}$ is a monovalent hydrocarbon group of 1 to 20 carbon atoms which may have a substituent, each $R^{01}$ being the same or different; and $R^{05}$ is a monovalent hydrocarbon group of 1 to 20 carbons which may have a substituent.

10. The silicone composition of claim 5, wherein $R^{04}$ is methyl, ethyl, propyl, butyl, pentyl, hexyl, heptyl, octyl, isopropyl, isobutyl, tertiary-butyl, isopentyl, neopentyl, cyclopentyl, cyclohexyl, cycloheptyl, chloromethyl, 3-chloropropyl, 3,3,3-trifluoropropyl, bromopropyl, ethenyl, 1-methylethenyl, 2-propenyl, 2-propynyl, phenyl, tolyl, benzyl, 2-phenylethyl, α,α,α-trifluorotolyl, or chlorobenzyl.

11. The addition-curable silicone composition of claim 5, further comprising:

(D) an effective amount of a regulator selected from the group consisting of acetylene compounds, nitrogen compounds, organophosphorus compounds, oxime compounds, organochlorine compounds, and mixtures thereof;

(E) from 1 to 2,000 parts by weight, per 100 parts by weight of component (A), of an inorganic filler selected from the group consisting of metals, metal oxides, metal hydroxides, metal nitrides, metal carbonates, and carbon allotropes;

(F) from 1 to 200 parts by weight, per 100 parts by weight of component (A), of a hydrolyzable organopolysiloxane compound of general formula (i) below

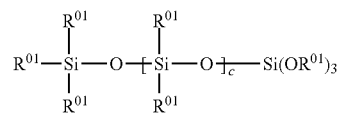

wherein $R^{01}$ is a monovalent hydrocarbon group of 1 to 20 carbon atoms which may have a substituent, each $R^{01}$ being the same or different; and the letter c is an integer from 5 to 100; and (G) from 0.01 to 10 parts by weight, per 100 parts by weight of component (A), of a hydrolyzable organosilane compound of general formula (ii) below $$R^{05}\text{—Si(OR}^{01})_3 \qquad \text{(ii)}$$

wherein $R^{01}$ is a monovalent hydrocarbon group of 1 to 20 carbon atoms which may have a substituent, each $R^{01}$ being the same or different; and $R^{05}$ is a monovalent hydrocarbon group of 1 to 20 carbons which may have a substituent.

* * * * *